United States Patent
Whitaker

(10) Patent No.: US 10,788,135 B2
(45) Date of Patent: Sep. 29, 2020

(54) MULTI-PORT VALVE

(71) Applicant: NORDSON CORPORATION, Westlake, OH (US)

(72) Inventor: Carl T. Whitaker, Berthoud, CO (US)

(73) Assignee: Nordson Corporation, Westlake, OH (US)

( * ) Notice: Subject to any disclaimer, the term of this patent is extended or adjusted under 35 U.S.C. 154(b) by 107 days.

(21) Appl. No.: 15/892,655

(22) Filed: Feb. 9, 2018

(65) Prior Publication Data
US 2019/0249787 A1 Aug. 15, 2019

(51) Int. Cl.
*F16K 11/076* (2006.01)
*F16K 11/085* (2006.01)

(52) U.S. Cl.
CPC .......... *F16K 11/076* (2013.01); *F16K 11/085* (2013.01); *F16K 11/0853* (2013.01); *F16K 11/0856* (2013.01)

(58) Field of Classification Search
USPC .................................................. 137/625.47
See application file for complete search history.

(56) References Cited

U.S. PATENT DOCUMENTS

| | | | | |
|---|---|---|---|---|
| 545,769 A * | 9/1895 | Bowman | .................... | F16K 5/12 251/209 |
| 3,773,076 A | 11/1973 | Smith | | |
| 3,814,129 A * | 6/1974 | Cioffi | ...................... | F16K 11/08 137/625.11 |
| 4,802,506 A * | 2/1989 | Aslanian | ........... | A61M 5/16881 137/556 |
| 5,490,660 A * | 2/1996 | Kamezawa | ........... | F16K 35/027 251/96 |
| 5,848,611 A * | 12/1998 | Stanevich | ........... | F16K 11/0856 137/625.47 |
| 2010/0319796 A1 | 12/2010 | Whitaker | | |
| 2014/0026998 A1 | 1/2014 | Hernandez et al. | | |

OTHER PUBLICATIONS

ISA/220—Notification of Transmittal of Search Report and Written Opinion of the ISA, or the Declaration dated Apr 18, 2019 for WO Application No. PCT/US19/015085.

* cited by examiner

*Primary Examiner* — John Fox
(74) *Attorney, Agent, or Firm* — Baker & Hostetler LLP

(57) ABSTRACT

A multi-port valve is disclosed that includes a valve body having an outer surface, an inner surface that defines an internal cavity, an upper end, a lower end, a stop member extending from the upper end, a plurality of output ports for transmitting a liquid to respective outputs, and an input port for receiving the liquid from an input. The multi-port valve also includes a directional component positioned in the internal cavity and configured to be rotated relative to the valve body, where the directional component includes a stop member and defines an outer surface that includes a channel for directing the liquid from the input port to one of the plurality of output ports when the directional component is in a first rotational position and a blocking extension that extends through the channel to prevent the channel from completely extending around the circumference. The multi-port valve also includes a cover rotationally coupled to the directional component for rotating the directional component relative to the valve body.

22 Claims, 16 Drawing Sheets

MULTI-PORT VALVE

TECHNICAL FIELD

This disclosure generally relates to a valve for conveying a liquid between an input and an output. More particularly, this disclosure relates to a multi-port valve for selectively conveying a liquid between an input and one of a plurality of outputs.

BACKGROUND

A typical valve with more than two ports consists of at least one passageway formed through a rotating bushing. The rotating bushing is disposed within a valve body, and the passageway of the rotating bushing places an input port of the valve body in fluid communication with a select one of the output ports of the valve body. To keep fluid within the passageway, the valve body acts as a seal against the rotating bushing. To adjust the configuration of ports connected by the passageway, a user can manually rotate the rotating bushing relative to the valve body until a desired output port has been connected to the input port by the passageway. However, the quality of the fluid connection between the input port and the desired output port can be less than optimal if the rotating bushing is rotated slightly out of alignment with the desired output port. Additionally, the rotating bushing is subject to being inadvertently rotated during operation, which can also lead to a fluid flow that is less than optimal.

Therefore, there is a need for a multi-port valve that provides greater control over the amount of rotation permitted between the valve body and the rotating bushing, as well as control over discrete rotational positions permitted between the rotating bushing and the valve body.

SUMMARY

An embodiment of the present disclosure is a multi-port valve including a valve body having an outer surface, an inner surface opposite the outer surface that defines an internal cavity, a plurality of output ports extending from the outer surface for transmitting a liquid to respective outputs, and an input port extending from the outer surface for receiving the liquid from an input. The multi-port valve also comprises a directional component positioned in the internal cavity and configured to be rotated relative to the valve body, wherein the directional component defines an outer surface, the outer surface including a channel that extends partially around a circumference of the directional component and a blocking extension that extends through the channel to prevent the channel from completely extending around the circumference. The directional component is configured to direct the liquid from the input port to one of the plurality of output ports when the directional component is in a first rotational position.

Another embodiment of the present disclosure is a multi-port valve comprising a valve body that comprises an outer surface, an inner surface opposite the outer surface that defines an internal cavity, an upper end, a lower end opposite the upper end, a stop member extending from the upper end, a plurality of output ports extending from the outer surface for transmitting a liquid to respective outputs, and an input port extending from the outer surface for receiving the liquid from an input. The multi-port valve also comprises a directional component positioned in the internal cavity and configured to be rotated relative to the valve body, where the directional component defines an outer surface that includes a channel for directing the liquid from the input port to one of the plurality of output ports when the directional component is in a first rotational position. The multi-port valve further comprises a cover rotationally coupled to the directional component for rotating the directional component relative to the valve body, where the directional component includes a stop member. Contact between the stop member of the cover and the stop member of the valve body limits rotation of the cover and the directional component relative to the valve body.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1A:
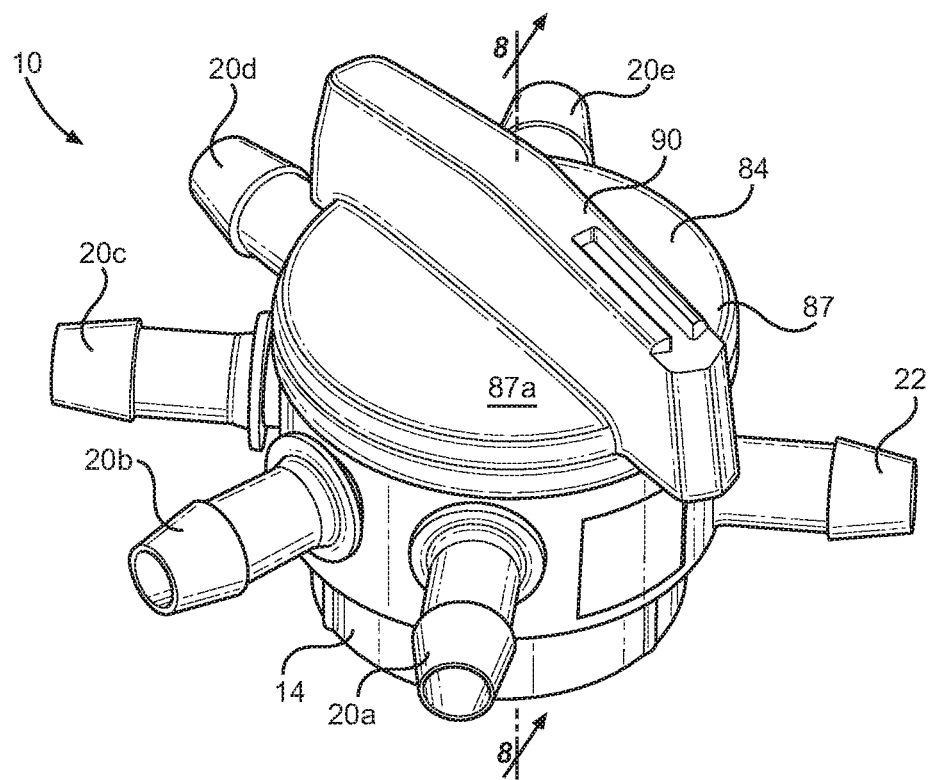
FIG. 1A is a perspective view of a multi-port valve according to an embodiment of the present disclosure.
Figure 1B:
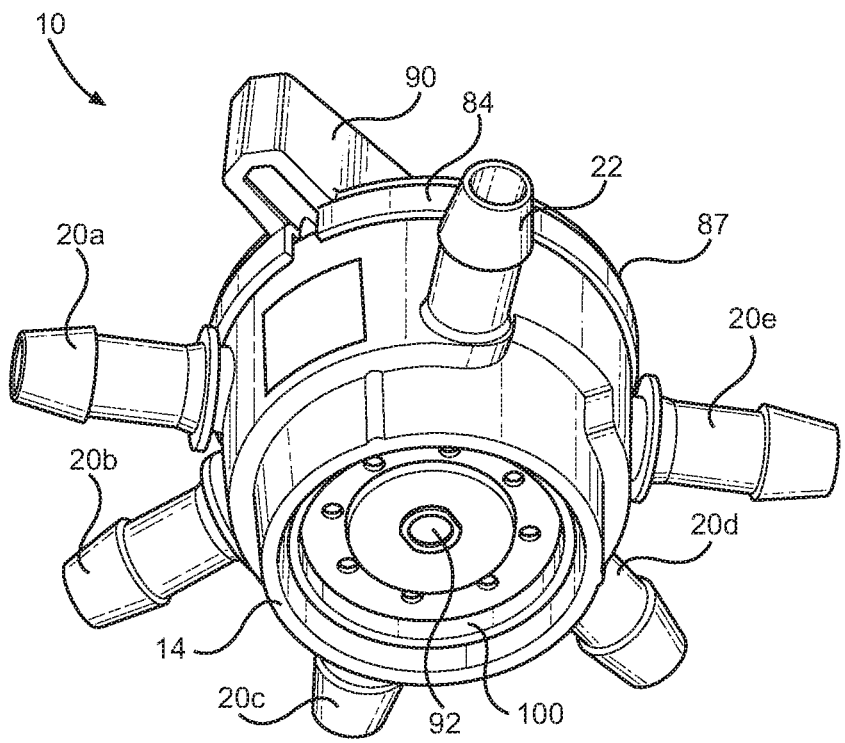
FIG. 1B is an alternative perspective view of the multi-port valve shown in FIG. 1A.
Figure 2:
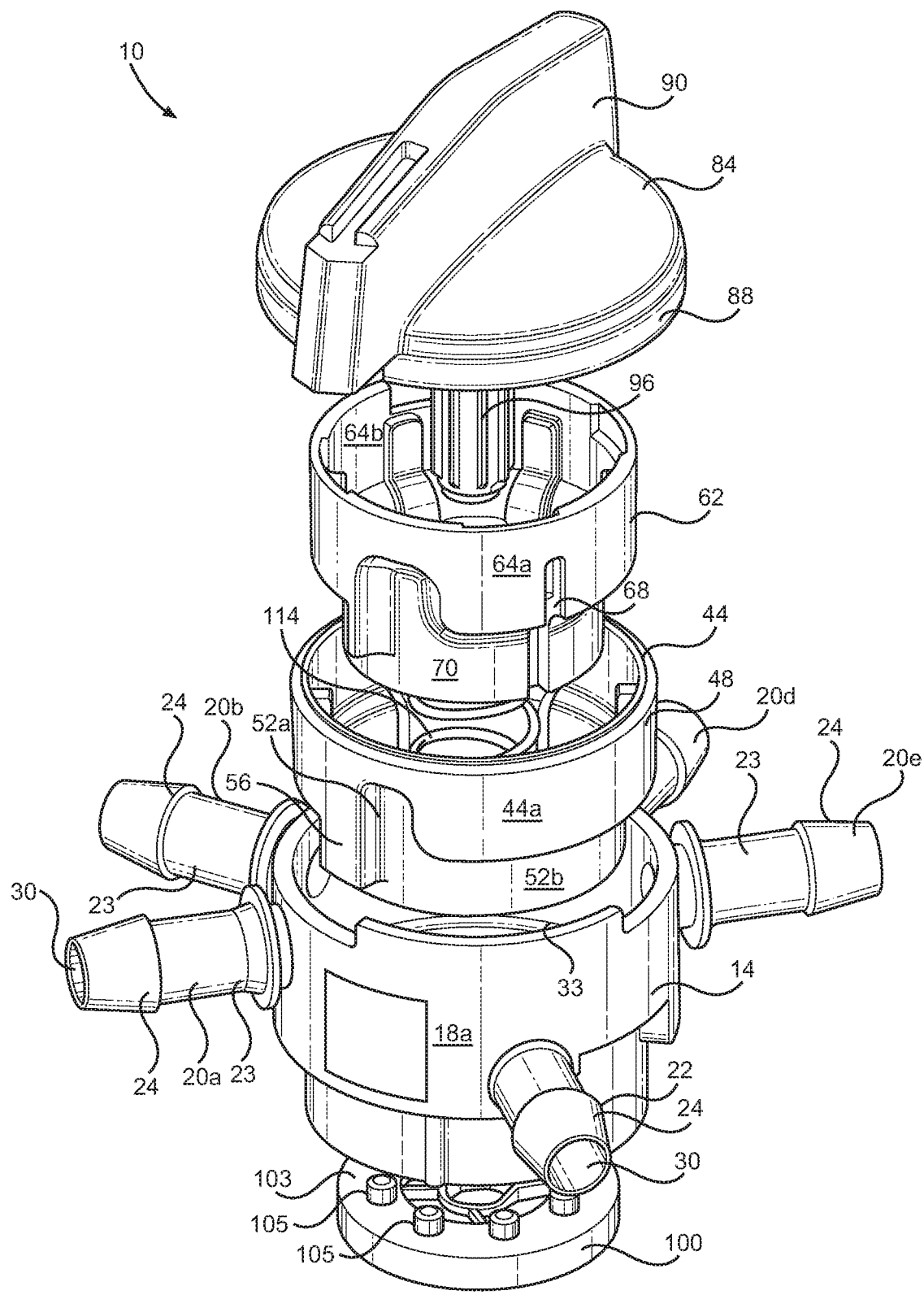
FIG. 2 is an exploded view of the multi-port valve shown in FIG. 1A.
Figure 3A:
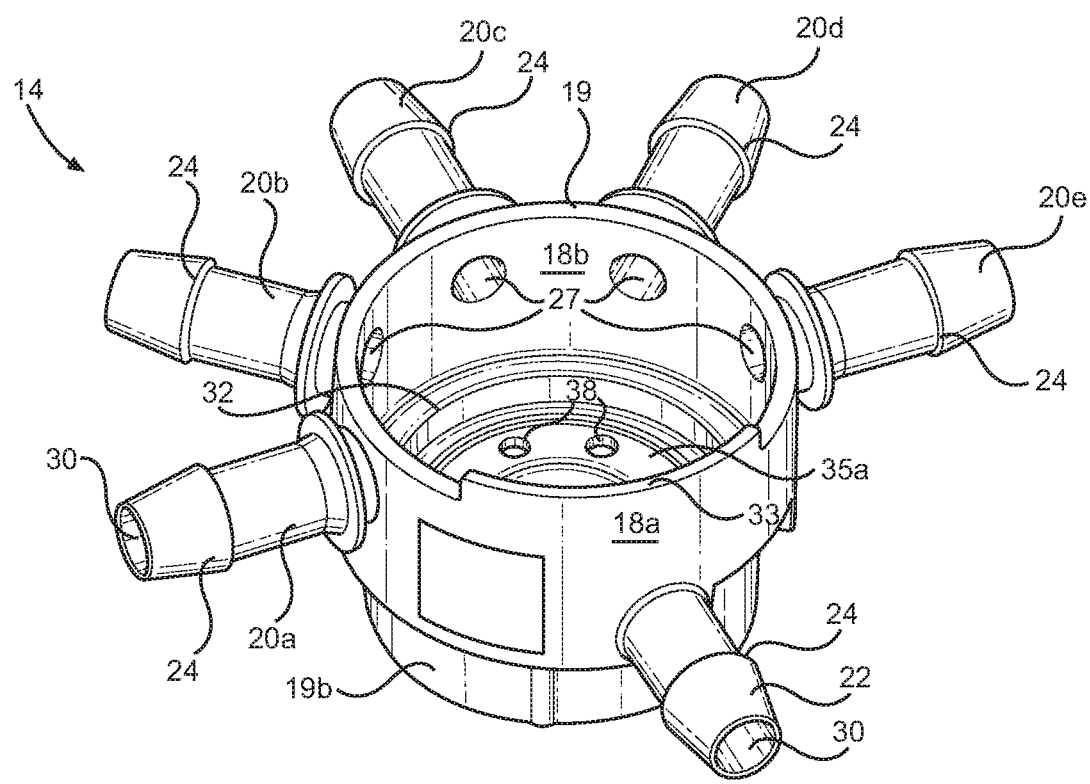
FIG. 3A is a perspective view of a valve body of the multi-port valve shown in FIG. 1A.
Figure 3B:
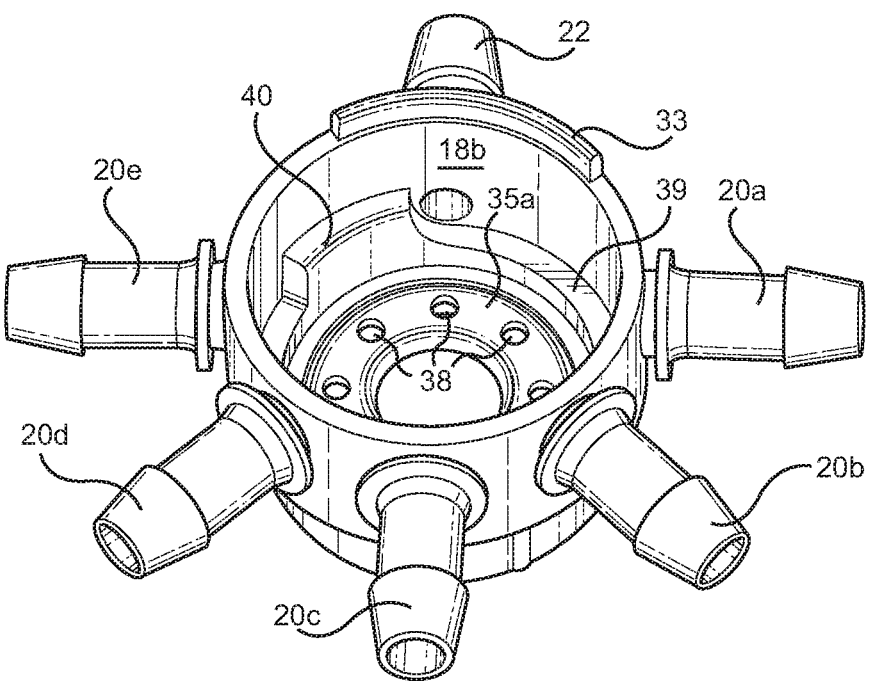
FIG. 3B is an alternative perspective view of the valve body shown in FIG. 3A.
Figure 3C:
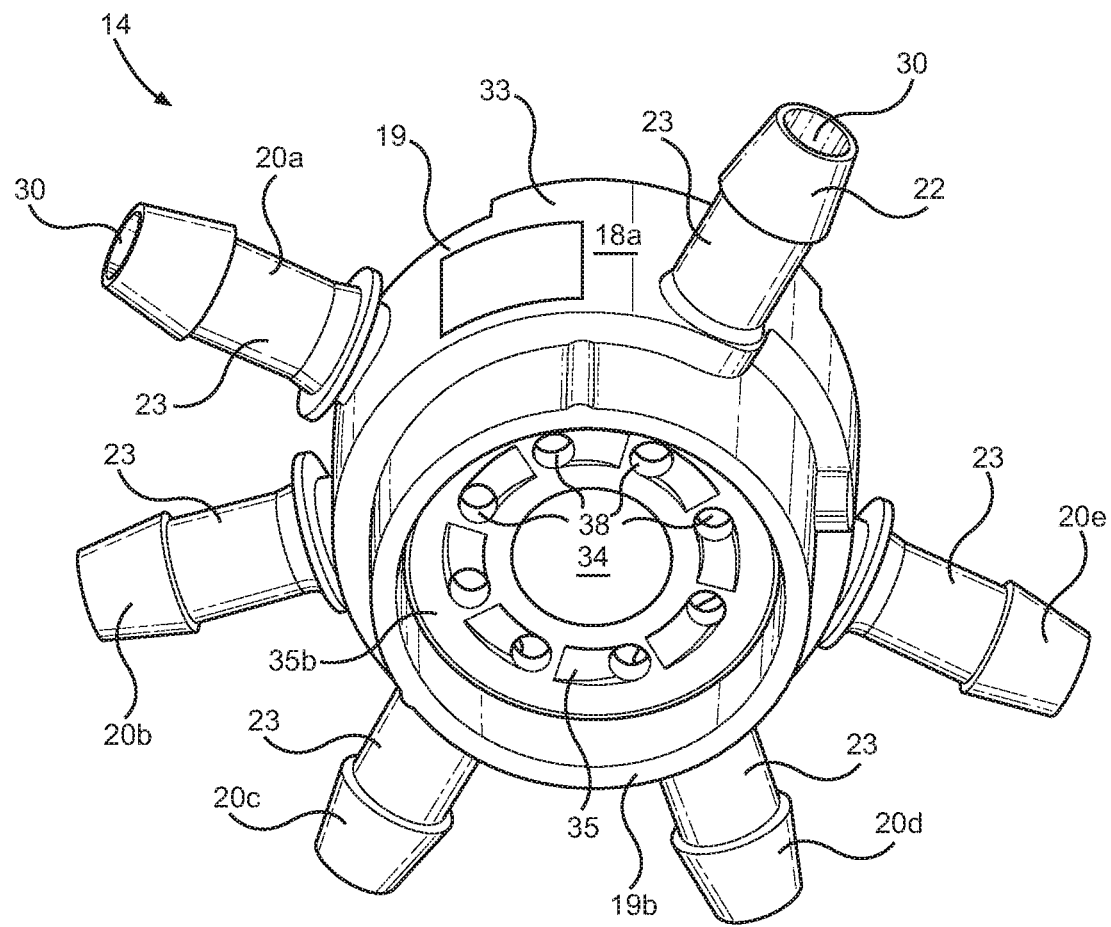
FIG. 3C is an alternative perspective view of the valve body shown in FIG. 3A.
Figure 4A:
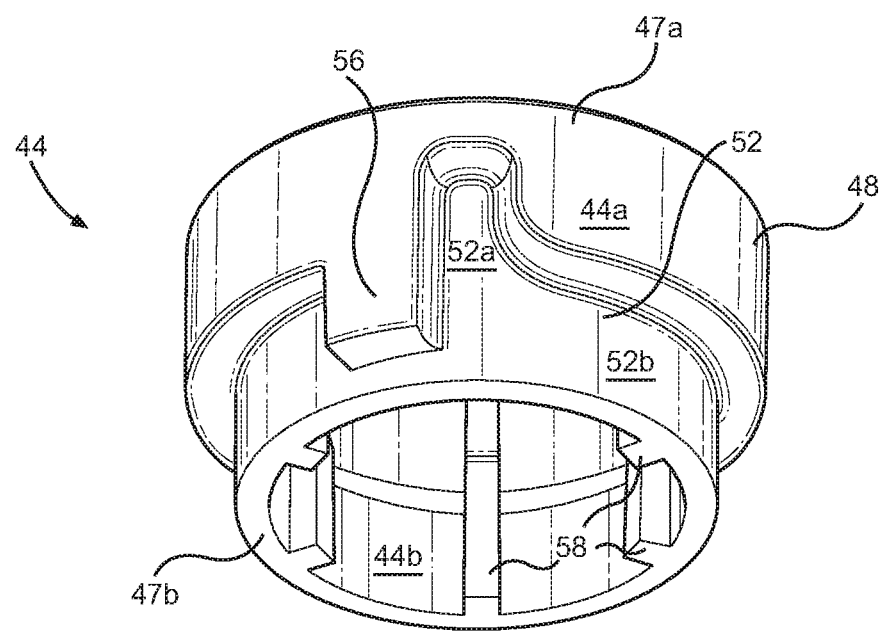
FIG. 4A is a perspective view of a directional component of the multi-port valve shown in FIG. 1A.
Figure 4B:
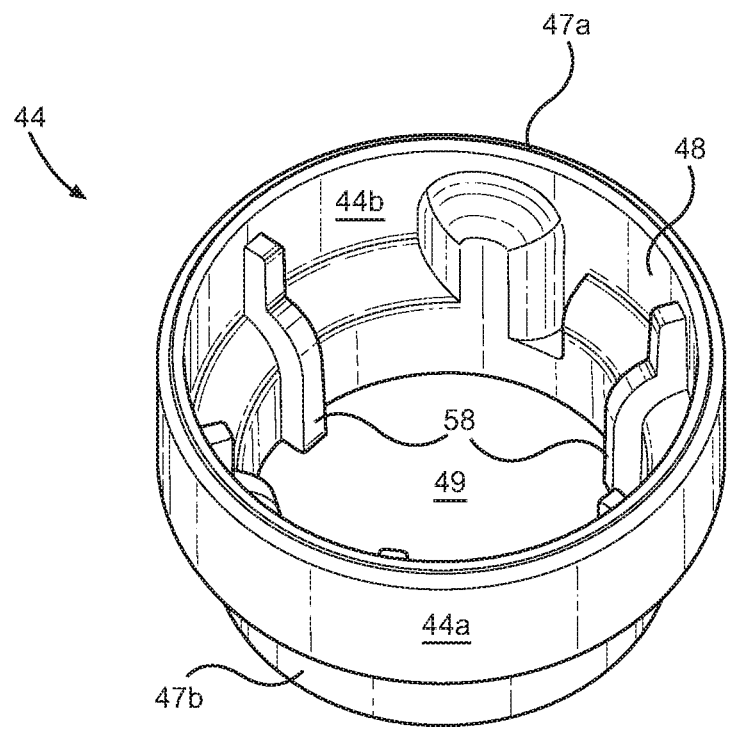
FIG. 4B is an alternative perspective view of the directional component shown in FIG. 4A.
Figure 5A:
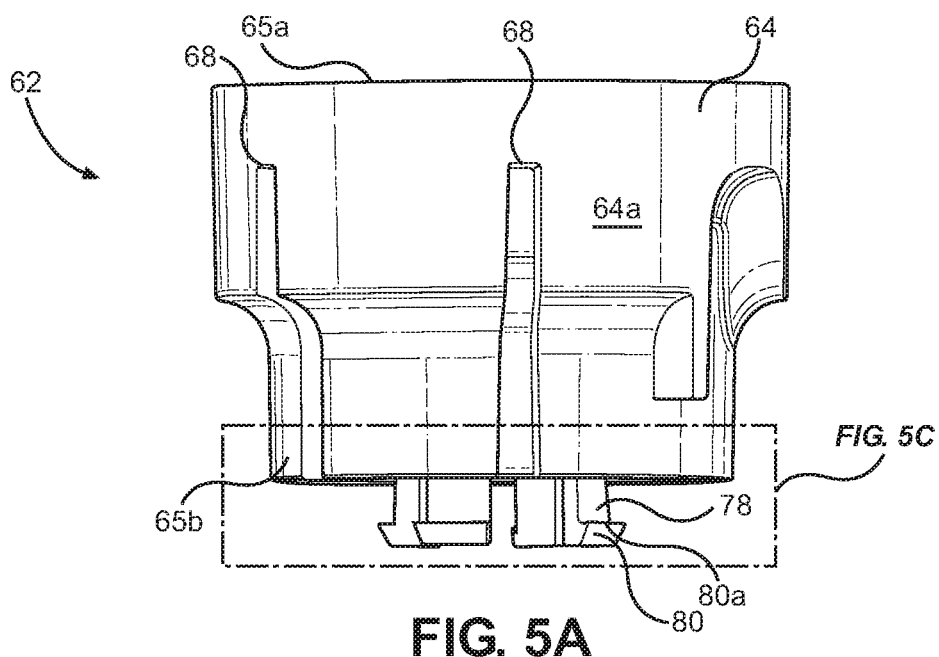
FIG. 5A is a side view of a coupler of the multi-port valve shown in FIG. 1A.
Figure 5B:
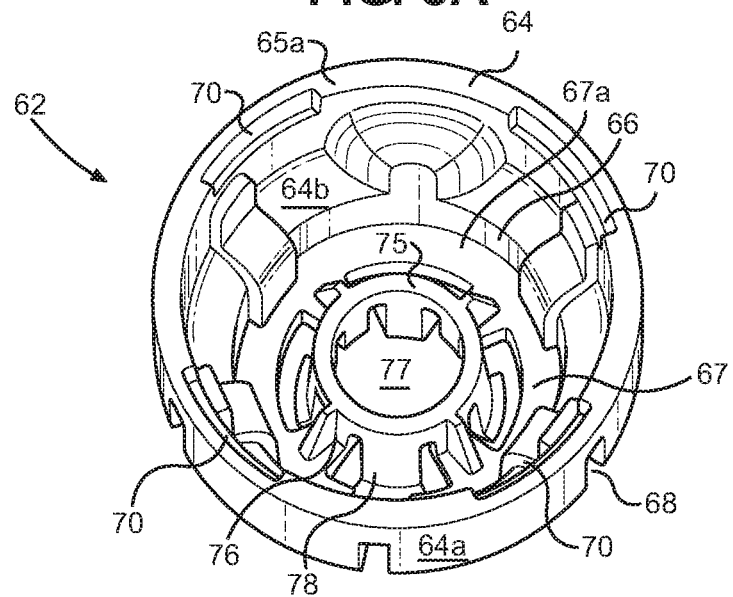
FIG. 5B is a perspective view of the coupler shown in FIG. 5A.
Figure 5C:
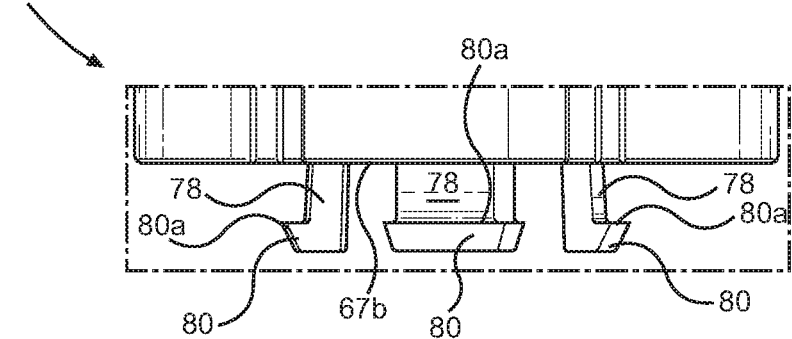
FIG. 5C is a side view of a portion of the coupler shown in FIG. 5A, as noted by the encircled region in FIG. 5A.
Figure 6A:
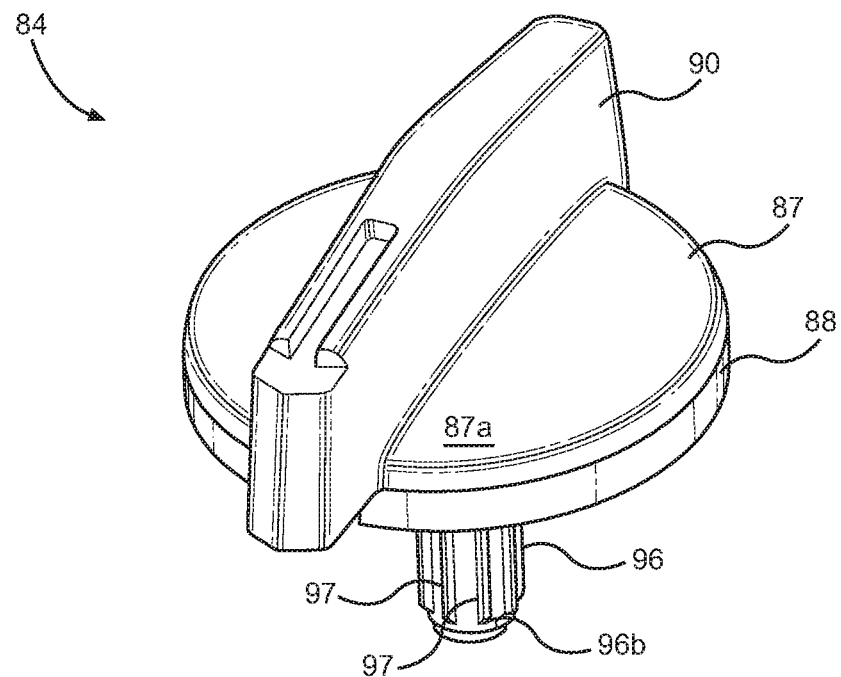
FIG. 6A is a perspective view of a cover of the multi-port valve shown in FIG. 1A.
Figure 6B:
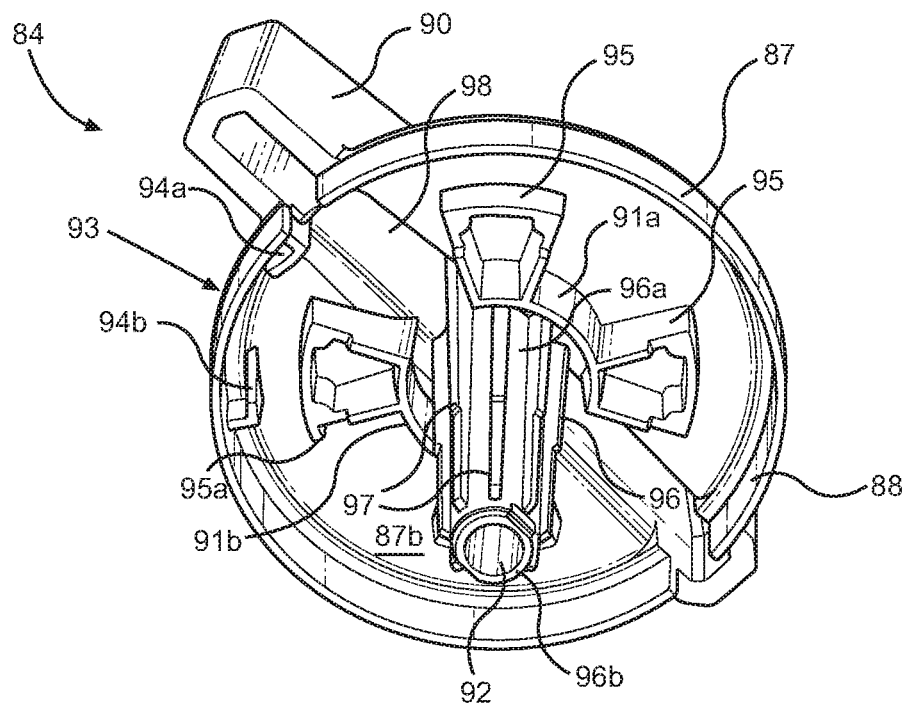
FIG. 6B is an alternative perspective view of the cover shown in FIG. 6A.

Described herein is a multi-port valve 10, 120 that includes a valve body 14, 124 and a directional component 44, 154. Certain terminology is used to describe the multi-port valve 10, 120 in the following description for convenience only and is not limiting. The words "right", "left", "lower," and "upper" designate directions in the drawings to which reference is made. The words "inner" and "outer" refer to directions toward and away from, respectively, the geometric center of the description to describe the multi-port valve 10, 120 and related parts thereof. The terminology includes the above-listed words, derivatives thereof and words of similar import.

FIGS. 1A-9C depict a first embodiment of a multi-port valve 10 for selectively changing a flow path of fluid between combinations of an input port 22 and one of the output ports 20a-20e, or alternatively blocking the fluid from flowing to any of the output ports 20a-20e from the input port 22. Referring to FIGS. 1A-3B and 8-9C, the multi-port valve 10 includes a valve body 14 that includes an outer surface 18a and an inner surface 18b opposite the outer surface 18a. The valve body 14 also includes an upper end 19a, a lower end 19b vertically opposite the upper end 19a, and a central cavity 32 defined by the inner surface 18b. The valve body 14 can be formed of a substantially rigid polymer, co-polymer, or other plastic. The input port 22 and the output ports 20a-20e each extend radially away from the outer surface 18a of the valve body 14. For convenience in identification hereinafter, the output ports 20a-20e can be referred to as a first output port 20a, a second output port 20b, a third output port 20c, a fourth output port 20d, and a fifth output port 20e. Each of the input port 22 and the output ports 20a-20e can define substantially hollow bodies that extend from the outer surface 18a and terminate at an outer opening 30. The input port 22 functions to interface with and receive liquid from an input, such as a piece of conventional flexible tubing. Similarly, each of the output ports 20a-20e function to interface with and transmit liquid to an output, such as another piece of conventional flexible tubing. Though five output ports 20a-20e are shown, the multi-port valve 10 can include more or less output ports as desired. Also, though the output ports 20a-20e and the input port 22 are shown as arranged around the valve body 14 in a particular arrangement, the relative positions of the output ports 20a-20e and the input port 22 can be rearranged as desired.

Figure 8:
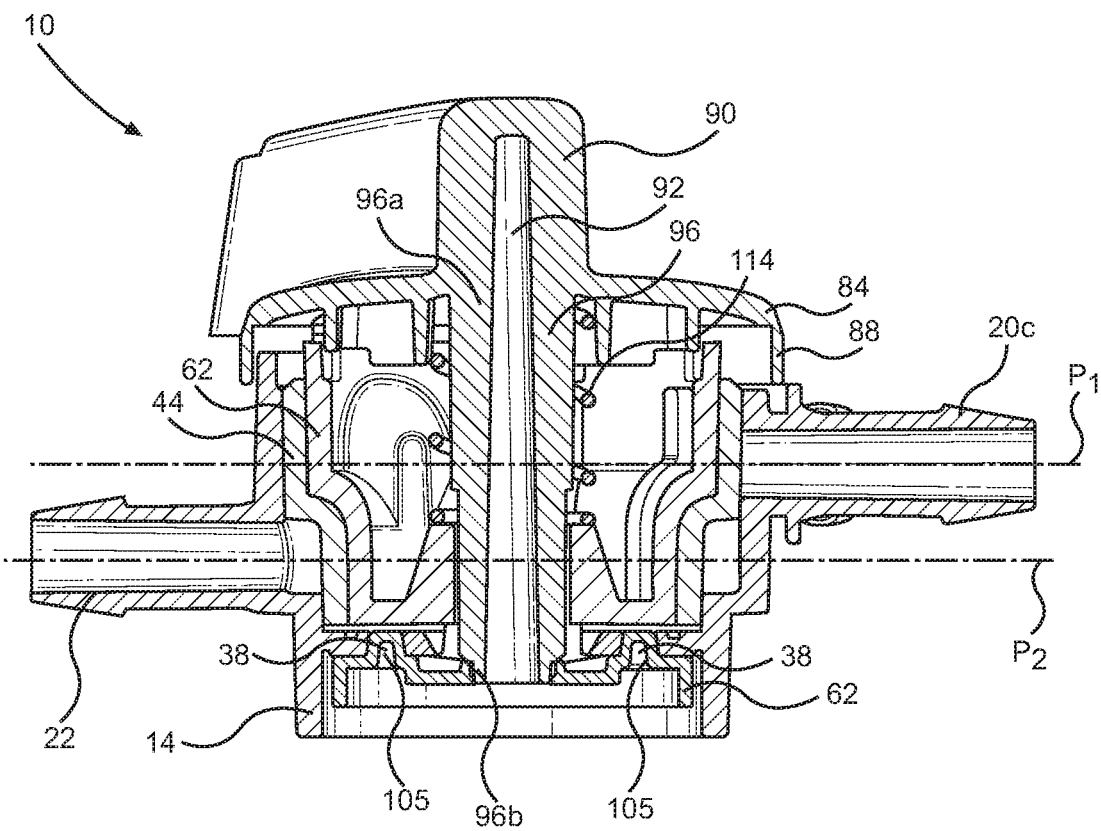
FIG. 8 is a cross-sectional view of the multi-port valve shown in FIG. 1, taken along line 8-8 shown in FIG. 1A.

The input port 22 and each of the output ports 20a-20e can include an internal passage 28 for receiving a flow of liquid, where each of the passages extends from an inner opening 27 on the inner surface 18b of the valve body 14 to an outer opening 30 located at the end of the respective port. As shown in FIG. 8, the central axis of each of the output ports 20a-20e extends along a first plane $P_1$ and the central axis of the input port 22 extends along a second plane $P_2$. The second plane $P_2$ can be spaced from the first plane $P_1$ and extend substantially parallel to the first plane $P_1$. Though the second plane $P_2$ is depicted as positioned below the first plane $P_1$, the first and second planes $P_1$ and $P_2$, and thus the input port 22 and the output ports 20a-20e, can be repositioned as desired. Each of the input port 22 and the output ports 20a-20e can be formed with a straight shaft 23 and a barb 24 extending from the outer surface of the straight shaft 23 in order to engage and retain a respective input or output, which can be a piece of flexible tubing as previously described.

The valve body 14 also includes a ledge 39 that extends from the inner surface 18b and extends partially around the outer circumference of the central cavity 32. The ledge 39 is prevented from extending entirely around the outer circumference of the central cavity 32 by a flow stop rib 40 that extends upward from the ledge 39 and outerward from the inner surface 18b. When the multi-port valve 10 is fully assembled, the ledge 39 defines the lower limit of the flow of fluid flowing through the multi-port valve 10 and the flow stop rib 40 prevents fluid from flowing in a counter-clockwise direction after it enters the input port 22, as will be discussed further below.

Continuing with FIGS. 1A-3B and 9A-9C, the valve body 14 can also include a stop member 33 that extends from the upper end 19a. The stop member 33 can be a solid tab that extends vertically upward from the upper end 19a of the valve body 14, as well as circumferentially around the top of the upper end 19a of the valve body 14. As shown, the stop member 33 can extend about 40 degrees around the upper end 19a. However, the stop member 33 can be alternatively shaped and sized as desired. The stop member 33 is configured to interact with a stop member 93 located on the cover 84 for limiting the rotational range of the directional component 44 relative to the valve body 14. The interaction between the stop member 33 of the valve body 14 and the stop member 93 of the cover 84 will be described further below.

The valve body 14 includes a bottom ledge 35 that extends inward from the inner surface 18b at the lower end 19b. The bottom ledge 35 can be substantially ring-shaped, and can define a top surface 35a, a bottom surface 35b opposite the top surface 35a, and a central bore 34 that extends vertically through the bottom ledge 35 from the top surface 35a to the bottom surface 35b. The central bore 34 is open to the central cavity 32, but defines a substantially smaller diameter than the central cavity 32. The bottom ledge 35 includes at least one alignment bore 38 that extends from the top surface 35a to the bottom surface 35b. In the depicted embodiment, the bottom ledge 35 includes eight alignment bores 38 equidistantly spaced circumferentially around the bottom ledge 35, as well as equidistantly spaced radially from the center of the central bore 34. However, it is contemplated that different numbers of alignment bores 38 can be included, and that the relative positions of the alignment bores 38 can vary. For example, the bottom ledge 35 can include one alignment bore, two alignment bores, or more than eight alignment bores. The bottom ledge 35, and particularly the alignment bores 38, function to rotationally lock the directional component 44 relative to the valve body 14 in particular positions, as will be described below.

Now referring to FIGS. 1A-2 and 4A-4B, the multi-port valve 10 includes a directional component 44 configured to be received within the central cavity 32 of the valve body 14. The directional component 44 includes a sidewall 48 that has an outer surface 44a, an inner surface 44b opposite the outer surface 44a, an upper end 47a, and a lower end 47b opposite the upper end 47a. The directional component 44 can be formed of an elastomeric material, such as urethane or silicone. The directional component 44 can also include a central cavity 49 that extends through the directional component 44 from the upper end 47a to the lower end 47b, the central cavity 49 being defined by the inner surface 44b. As a result, the directional component 44 can be substantially shaped as a hollow cylinder, with the sidewall 48 having a small thickness relative to the diameter of the central cavity 49. The sidewall 48 can have a substantially consistent thickness throughout, such that the shape of the inner surface 44b of the directional component 44 generally mirrors the shape of the outer surface 44a. The outer surface 44a can also be referred to as an engagement sealing surface, as the outer surface 44a is configured to contact the inner surface 18b of the valve body 14. The directional component 44 can include at least one rib 58 that extends radially inward from the inner surface 44b and is configured to engage a corresponding slot 68 defined by a coupler 62, which will be discussed below. Though five ribs 58 are depicted, the directional component can include more or less ribs 58 as desired. For example, the directional component 44 can include only one rib, two ribs, or more than five ribs.

The directional component 44 can include a fluid channel 52 that extends from the outer surface 44a into the sidewall 48 and partially around a circumference of the directional component 44. When the directional component 44 is disposed within the central cavity 32 of the valve body 14 and the outer surface 44a contacts the inner surface 18b of the valve body 14, the fluid channel 52 can be configured to receive a flow of liquid from the input port 22 and direct the flow of liquid to one of the output ports 20a-20e. In this embodiment, the fluid channel 52 is a single, continuous channel that is formed across a majority of the circumference of the directional component 44, though it is important to note that the fluid channel 52 is not formed across the entire circumference.

Continuing with FIGS. 1A-2 and 4A-4B in the depicted embodiment the fluid channel 52 can be understood as comprising two portions—a horizontal portion 52b and a vertical portion 52a that extends from the horizontal portion 52b. The width and depth of the fluid channel 52 can be selected in order to provide an adequate and constant fluid flow or to satisfy any other functional considerations. The horizontal portion 52b can extend substantially around a majority of the circumference of the directional component 44, while the vertical portion 52a can extend upward from the horizontal portion 52b and terminate at a location below the top of the directional component 44. The horizontal portion 52b can define a similar width and depth as the vertical portion 52a, though these dimensions may differ as desired. When the directional component 44 is disposed within the central cavity 32 of the valve body 14, the first plane $P_1$ can extend through the vertical portion 52a of the fluid channel 52, such that a part of the vertical portion 52a is vertically aligned with the output ports 20a-20e. Likewise, when the directional component 44 is disposed within the central cavity 32 of the valve body 14, the second plane $P_2$ can extend through the horizontal portion 52b of the fluid channel 52, such that a part of the horizontal portion 52b is vertically aligned with the input port 22. As a result, in various rotational positions the horizontal portion 52b can receive a liquid flow from the input port 22 and direct the liquid flow to the vertical portion 52a, which then directs the liquid flow to one of the output ports 22a-22e.

The horizontal portion 52b of the fluid channel 52 is prevented from extending completely around the circumference of the directional component 44 by a blocking extension 56 that extends downwardly from the outer surface 18a. The blocking extension 56 thus divides the horizontal portion 52b such that the horizontal portion 52b substantially forms a C-shape around the circumference of the directional component 44. Effectively, the blocking extension 56 prevents liquid from flowing completely around the entire circumference of the directional component 44 when the multi-port valve 10 is fully assembled. The blocking extension 56 can define a variety of widths, depending on the intended length of the horizontal portion 52b of the fluid channel 52. Regardless of the width of the blocking extension 56, the blocking extension 56 can contact the inner surface 18b of the valve body 14 like the rest of the outer surface 44a of the directional component 44 that does not define the fluid channel 52. In certain rotational positions, the blocking extension 56 can align with the inner opening 27 of the internal passage 28 of the input port 22, such that liquid is prevented from flowing into the fluid channel 52 from the input port 22. This rotational position will be discussed further in connection with FIG. 9B below.

Now referring to FIGS. 1A-2 and 5A-5C, the multi-port valve 10 can include a coupler 62. The coupler 62 can include a sidewall 64 that defines an outer surface 64a, an inner surface 64b opposite the outer surface 64a, an upper end 65a, and a lower end 65b opposite the upper end 65a. Like the valve body 14 and the directional component 44, the coupler 62 can be formed of a substantially rigid polymer, co-polymer, or other plastic. The coupler 62 can also include a central cavity 66 defined by the inner surface 64b that extends through the directional component 44 from the upper end 65a to the lower end 65b. The sidewall 64 can include at least one slot 68 that extends from the outer surface 64a of the coupler 62 radially into the sidewall 64. In the depicted embodiment, the coupler 62 is shown as including five slots 68. However, the coupler 62 can include more or less slots 68 as desired, though the number of slots 68 will generally correspond to the number of ribs 58 included in the directional component 44. This is because when the multi-port valve 10 is assembled, the slots 68 can each receive a corresponding rib 58 of the directional component 44 to align and secure the directional component 44 and coupler 62 in relation to each other. Likewise, as the coupler 62 can be disposed within the central cavity 49 of the directional component 44, the outer surface 64a of the coupler 62 can substantially match the shape of the inner surface 44b of the directional component 44 to ensure a tight fit. The coupler 62 can also include a plurality of recesses 70 that extend from the upper end 65a and the inner surface 64b into the sidewall 64. Though four recesses 70 are shown, and the recesses 70 are shown as being spaced equidistantly around the coupler 62, more or less recesses 70 can be included, and the recesses 70 can be differently spaced. As will be discussed further, the recesses 70 are configured to engage a portion of the cover 84 for rotationally fixing the cover 84 relative to the coupler 62.

The coupler 62 can further include a bottom ledge 67 that extends inward from the inner surface 64b at the lower end 65b. The bottom ledge 67 can be substantially ring-shaped, and can define a top surface 67a and a bottom surface 67b opposite the top surface 67a. A plurality of ribs 76 can extend upward from the top surface 67a of the bottom ledge 67 to a central support 75 positioned above the bottom ledge 67. Though four ribs 76 are depicted, the multi-port valve 10 can include more or less than four ribs 76 as desired. The central support 75 can be substantially ring-shaped, and can define a bore 77 that extends centrally through. The bore 77 can be open to the central cavity 66, and can define a substantially smaller cross-section than the central cavity 66. When the multi-port valve 10 is fully assembled, the central support 75 can support the bottom end of a spring 114, which will be described further below.

A plurality of extensions 78 can extend downward from the bottom surface 67b of the bottom ledge 67. Each of the extensions 78 can include a lip 80 that extends radially outward from the downward end of the extension 78, where each lip 80 defines a substantially planar upper surface 80a. Though four extensions 78 are shown, the coupler 62 can include more less than four extensions as desired. For example, the coupler 62 can include one extension, two extensions, or more than four extensions. Further, though the extensions 78 are depicted as spaced substantially equidistantly around the bottom ledge 67, it is contemplated that the spacing of the extensions 78 can be altered. In the assembled configuration, when the coupler 62 is disposed within the central cavity 49 of the directional component 44 and the directional component 44 is disposed within the central cavity 32 of the valve body 14, the extensions 78 can extend through the central bore 34 of the valve body 14 and engage the bottom ledge 35. Specifically, the upper surface 80a of each respective lip 80 can engage the bottom surface 35b of the bottom ledge 35 of the valve body 14. This engagement axially secures both the coupler 62 and the directional component 44 relative to the valve body 14, while still allowing the coupler 62 and the directional component 44 to rotate relative to the valve body 14.

Now referring to FIGS. 1A-2 and 6A-6B, the multi-port valve 10 further includes a cover 84. The cover 84 includes a body 87 that has an upper surface 87a, a lower surface 87b opposite the upper surface 87a, and a rim 88 that extends downward from the lower surface 87b. The cover 84 can be formed of a substantially rigid polymer, co-polymer, or other plastic. A knob 90 can extend upwards from the upper surface 87a, where the knob 90 is configured to be gripped for manual rotation of the cover 84 and rotationally connected components. The knob 90 is depicted as having a greater diameter and height than the body 87 for easier manual actuation, though the knob 90 can be differently sized or shaped as desired. The cover 84 can also include a shaft 96 that extends downward from an upper end 96a attached to the lower surface 87b of the body 87 to a lower end 96b axially spaced from the body 87. The shaft 96 can define a bore 92 that extends from the lower end 96b to the upper end 96a, and can include a plurality of fluted ribs 97 that extend radially outward from the shaft 96. However, the bore 92 can extend to any extent through the shaft 96. In addition to the shaft 96, the knob 90 can also be substantially hollow and define a recess 98 that is in communication with the bore 92. When the multi-port valve 10 is fully assembled, the shaft 96 can extend through the bore 77 defined by the central support 75 of the coupler 62, and the lower surface 87b of the cover 84 can be configured to contact an upper end of the spring 114. As a result, the spring 114 contacts the lower surface 87b of the cover 84 at its upper end, extends over the shaft 96 and the fluted ribs 97, and contacts the central support 75 of the coupler 62 at its lower end.

The cover 84 can include a plurality of alignment tabs 95 extending downward from the lower surface 87b of the body 87. Each of the alignment tabs 95 can be configured as hollow and substantially trapezoidal, and can be received in a corresponding recess 70 of the coupler 62 when the multi-port valve 10 is fully assembled. As noted above, interaction between the alignment tabs 95 and the recesses 70 can serve to rotationally couple the coupler 62 to the cover 84. As a result, the directional component 44 is also rotationally coupled to the cover 84. As depicted, the cover 84 can include four alignment tabs 95 equidistantly spaced circumferentially around the shaft 96. However, the orientation and number of the alignment tabs 95 can very as desired. For example, the cover 84 can include one, two, or more than four alignment tabs, and the alignment tabs 95 can be unequally spaced circumferentially around the shaft 96. However, the spacing and number of the alignment tabs will generally correspond to the spacing and number of the recesses 70 of the coupler 62. In an embodiment, one of the alignment tabs 95 can include an extended rib 95a that can be received by a respective one of the recesses 70. The inclusion of the extended rib 95a in one of the alignment tabs 95 ensures that the cover 84 can be attached to the other components of the multi-port valve 10 in only one orientation. The cover 84 can also include first and second radial ribs 91a, 91b, where each of the first and second radial ribs 91a, 91b extends between adjacent ones of the alignment tabs 95. The first and second radial ribs 91a, 91b are configured to engage the outer side of the spring 114 when the multi-port valve 10 is fully assembled.

The cover 84 can also include a stop member 93 that extends inward from the inner surface of the rim 88. As depicted, the stop member 93 includes two circumferentially spaced stops: a first stop 94a and a second stop 94b. Each of the first and second stops 94a, 94b can be configured as hooked extensions extending from the inner surface of the rim 88, though other configurations are contemplated. Alternatively, the stop member 93 can define a single, monolithic stop that extends inward from the inner surface of the rim 88. During operation of the multi-port valve 10, the stop member 93 can be utilized to limit rotation of the cover 84, and thus the coupler 62 and the directional component 44, relative to the valve body 14. This occurs due to the contact between the stop member 93 and the stop member 33 that projects from the upper end 19a of the valve body 14.

Figure 7:
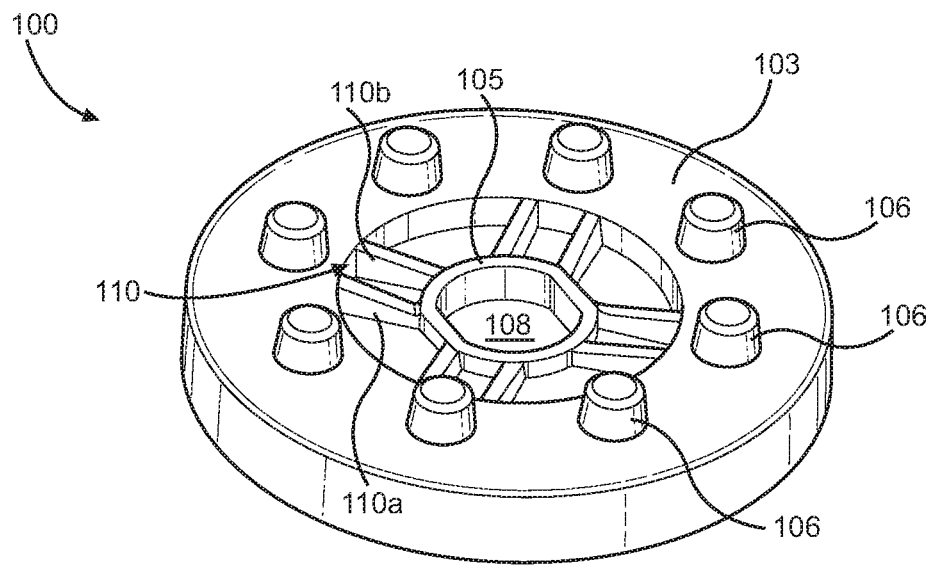
FIG. 7 is a perspective view of an alignment member of the multi-port valve shown in FIG. 1A.

Referring to FIGS. 7-8, the multi-port valve 10 can further include an alignment member 100 attached to the lower end 96b of the shaft 96 of the cover 84. Like the other components of the multi-port valve 10, the alignment member 100 can be formed of a substantially rigid polymer, co-polymer, or other plastic. The alignment member 100 can include a substantially annular body 103 and a plurality of legs 110 extending inward from the inner surface of the body 103. Each of the legs 110 can include a first leg 110a and a second leg 110b separate from the first leg 110a, and can extend from the body 103 to a central ring 105 concentrically positioned with respect to the body 103. Though each of the legs 110 is shown as including first and second legs 110a, 110b, each of the legs 110 can be alternatively configured. For example, in other embodiments, each of the legs can define a substantially monolithic body. The positioning of the body 103, the legs 110, and the central ring 105 provides the alignment member 100 with a substantially wheel and spoke shaped configuration. The central ring 105 defines a bore 108 that extends through the central ring 105, and can be centered with respect to the body 103 and the central ring 105. The central ring 105 can be configured to receive the lower end 96b of the shaft 96 of the cover 84 in order to axially and rotationally couple the cover 84 to the alignment member 100. For example, the central ring 105 can be attached to the lower end 96b of the shaft 96 through ultrasonic welding, though other attachment means are contemplated. The alignment member 100 can further include a plurality of protrusions 106 that extend from the upper surface of the body 103. Though the protrusions 106 are depicted as substantially cylindrical and equidistantly spaced about the body 103, the protrusions 106 can be alternatively configured as desired. Additionally, though eight protrusions 106 are depicted, the alignment member 100 can include different numbers of protrusions 106 in different embodiments. For example, the alignment member 100 can include one, two, or more than eight protrusions, where each protrusion is equidistantly spaced or non-equidistantly spaced about the body 103. As shown in FIG. 8, each of the protrusions 106 is sized and configured to be received in a respective alignment bore 38 of the valve body 14 for rotationally coupling and decoupling the cover 84 relative to the valve body 14, as will be described below.

Now referring to FIGS. 8-9C, the method of rotating components of the multi-port valve 10 and the various flow paths that can be achieved will be described. When the multi-port valve 10 is fully assembled, the cover 84 and the alignment member 100 are axially movable together relative to the valve body 14. Without any external forces applied to the multi-port valve 10, the cover 84 is initially in a first vertical position. This position is maintained by the spring 114, which applies a biasing force to the lower surface 87b of the cover 84, thus pushing the cover 84 upwards. As the alignment member 100 is rotationally and axially coupled to the cover 84, the spring 114 biasing the cover 84 upwards also biases the alignment member 100 upwards, such that in the first vertical position the protrusions 106 of the alignment member 100 are disposed within respective alignment bores 38 of the valve body 14. The interaction between the protrusions 106 and the valve body 14 in the first vertical position causes the cover 84, and thus the coupler 62 and the directional component 44, to be rotationally fixed relative to the valve body 14. The alignment bores 38 can be designed such that when the cover 84 and alignment member 100 are in the first vertical position, the directional component 44 is in one of a finite number of predetermined positions, where each predetermined position defines a unique flow path through the input port 22 and output ports 20a-20e.

To rotate the directional component 44 and alter the flow path through the multi-port valve 10, a downward force can be applied to the cover 84 to overcome the upward force of the spring 114, thus moving the cover 84 and the attached alignment member 100 downward relative to the valve body 14. With enough force, the alignment member 100 can be moved sufficiently downward such that the protrusions 106 are spaced downward relative to the alignment bores 38. Because the protrusions 106 are no longer constrained by the alignment bores 38 when the cover 84 and the alignment member 100 are in the second vertical position, the cover 84 and the alignment member 100—along with the directional component 44 and the coupler 62—can be freely rotated relative to the valve body 14. The cover 84 and alignment member 100 can be rotated in both a first rotational direction $R_1$ and a second rotational direction $R_2$ that is opposite the first rotational direction $R_1$. In the depicted embodiment, the first rotational direction $R_1$ is a counter-clockwise direction, and the second rotational direction $R_2$ is a clockwise direction. A user of the multi-port valve 10 can thus rotate the cover 84 to obtain the desired fluid flow path when the cover 84 and alignment member 100 are in the second vertical position. Once the desired flow path has been achieved, the downward force can be released from the cover 84, thus allowing the spring 114 to bias the cover 84 and alignment member 100 upward again into the first vertical position, and the protrusions 106 to again be received in respective ones of the alignment bores 38. As noted above, in the first vertical position, the cover 84, alignment member 100, directional component 44, and coupler 62 will again be rotationally fixed relative to the valve body 14. Additionally, the extent to which the cover 84 and rotationally coupled components can be rotated in the first rotational direction $R_1$ is limited by the interaction between the stop member 93 of the cover 84 and the extension 33 of the valve body 14.

Figure 9A:
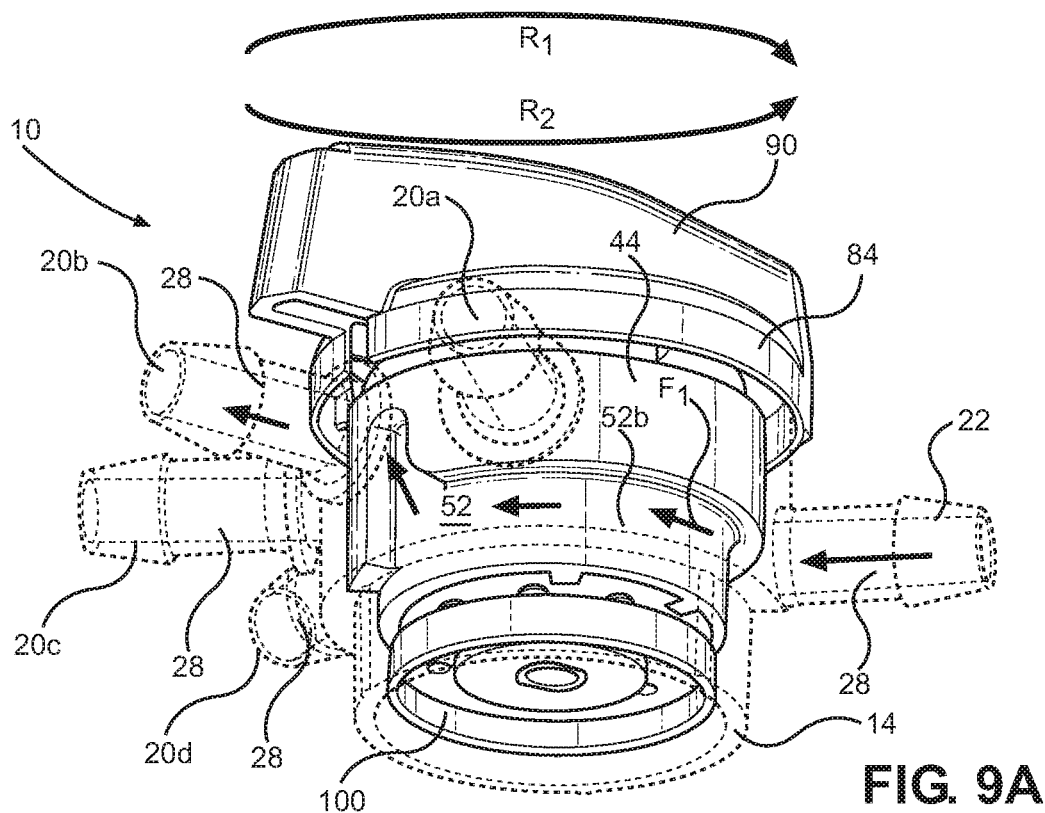
FIG. 9A is a perspective view of the multi-port valve shown in FIG. 1A, with the valve body rendered transparent and the directional component in a first position.

Continuing with FIGS. 8-9C, various rotational positions of the multi-port valve 10 will be discussed. Referring to FIG. 9A, in a first rotational position a first flow path $F_1$ is defined through the multi-port valve 10. In the first rotational position, the input port 22 receives a flow of fluid from an input, which then flows through the input port 22, through the fluid channel 52, and to the second output port 20b. Between the input port 22 and the second output port 20b, the flow of fluid is contained by the fluid channel 52, the inner surface 18b of the valve body 14, and the ledge 39, each of which prevents the fluid from escaping the fluid channel 52 and migrating to any of the other output ports. Due to the presence of the blocking extension 56, the fluid is prevented from flowing within the fluid channel 52 entirely around the complete circumference of the directional component 44 in the second rotational direction $R_2$. Likewise, the flow stop rib 40 prevents the fluid from flowing around the circumference of the directional component 44 in the first rotational direction $R_1$ after entering the multi-port valve 10 through the input port 22. To alter the fluid flow path, a user can apply a force to the cover 84 as previously described to move the cover 84 and alignment member 100 from the first vertical position to the second vertical position.

Figure 9B:
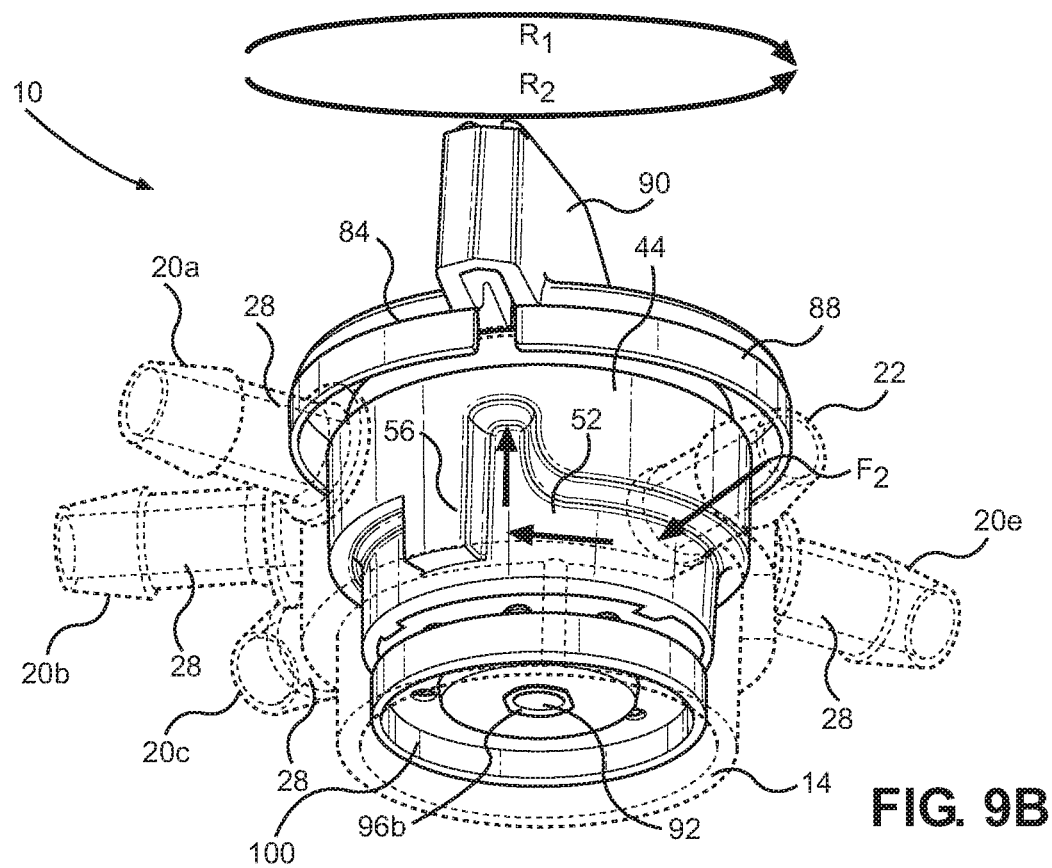
FIG. 9B is a perspective view of the multi-port valve shown in FIG. 1A, with the valve body rendered transparent and the directional component in a second position.

When the cover 84 and alignment member 100 are in the second vertical position, the user can rotate the cover in the second rotational $R_2$ to a second rotational position, as shown in FIG. 9B. The cover 84 can be prevented from rotating in the second rotational direction $R_2$ from the first rotational position to the second rotational position by the interaction of the stop member 93 of the cover 84 and the stop member 33 of the valve body 14. However, in other embodiments the rotational movement of the cover 84 from the first rotational position to the second rotational position can be reversed. The stop member 93 of the cover 84 and the stop member 33 of the valve body 14 can be configured such that the second rotational position depicted in FIG. 9B is the furthest the cover 84 and the rotationally coupled components can be rotated relative to the valve body 14 in the first rotational direction $R_1$. In the second rotational position, the blocking extension 56 of the directional component 44 is positioned circumferentially between the input port 22 of the valve body 14 and the first output port 20a. As a result, a second flow path $F_2$ is defined in the second rotational position, in which the blocking extension 56 and flow stop rib 40 prevent the flow of fluid from exiting the multi-port valve 10 through any of the output ports 20a-20e. The second flow path $F_2$ thus only extends from the input to the end of the vertical portion 52a of the fluid channel 52. Because of this, the second rotational position can be referred to as an off position for the multi-port valve 10, as no fluid will be transferred through the multi-port valve 10 from the input to any of the outputs attached to the output ports 20a-20e.

Figure 9C:
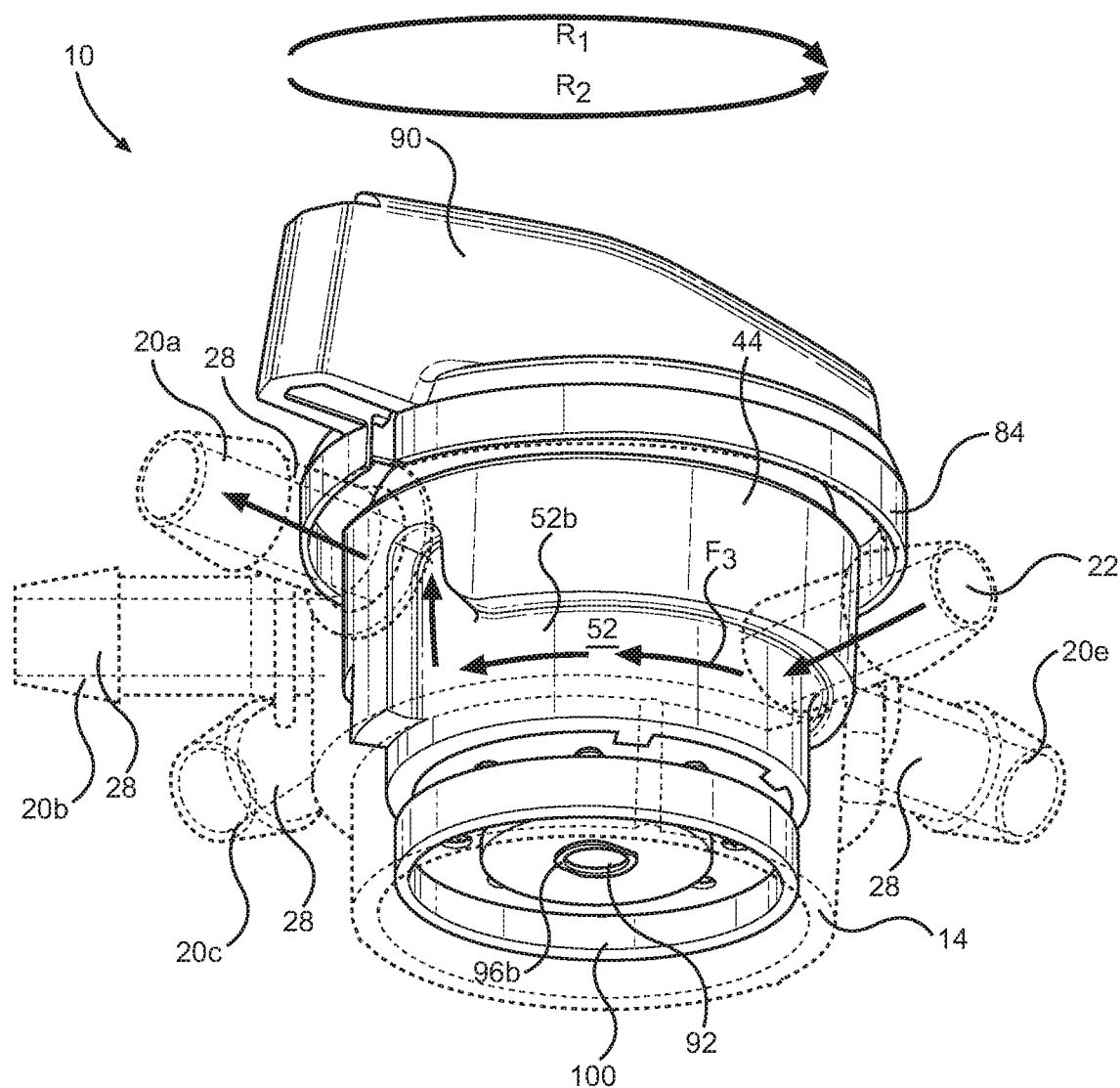
FIG. 9C is a perspective view of the multi-port valve shown in FIG. 1A, with the valve body rendered transparent and the directional component in a third position.
Figure 10A:
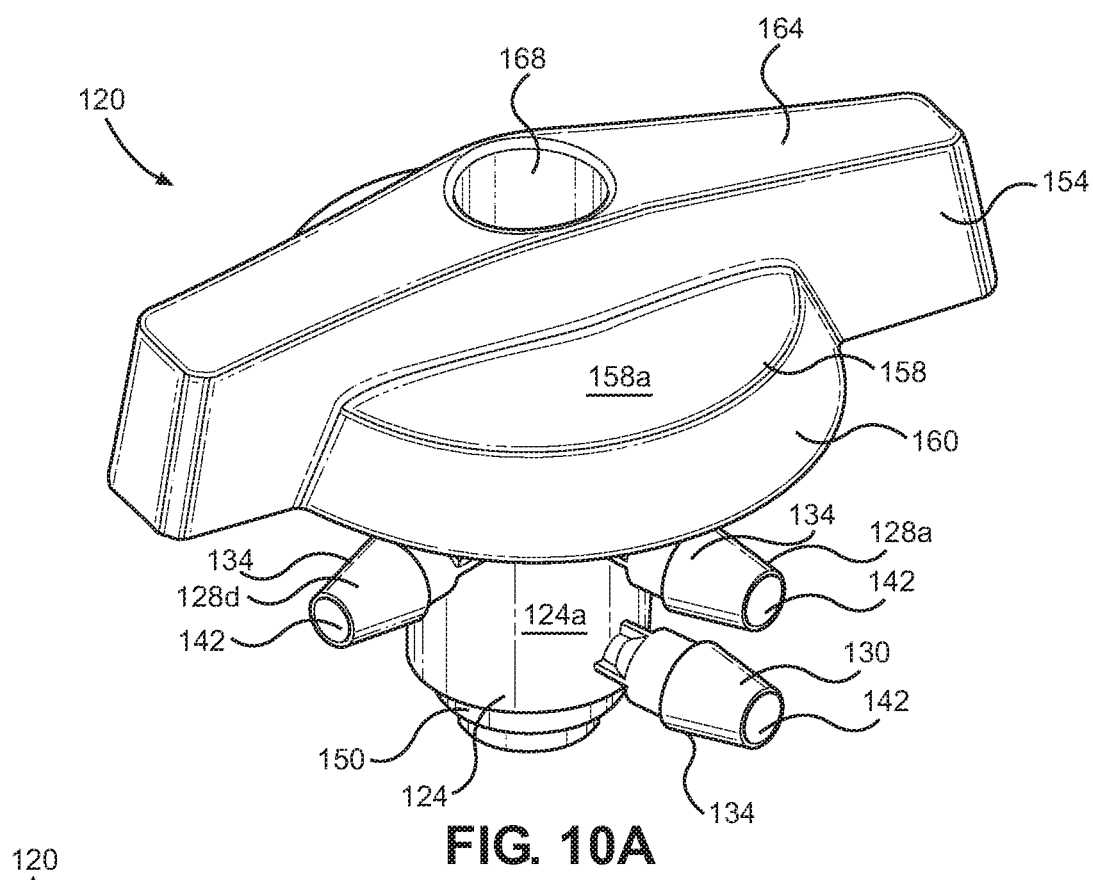
FIG. 10A is a perspective view of a multi-port valve according to another embodiment of the present disclosure.
Figure 10B:
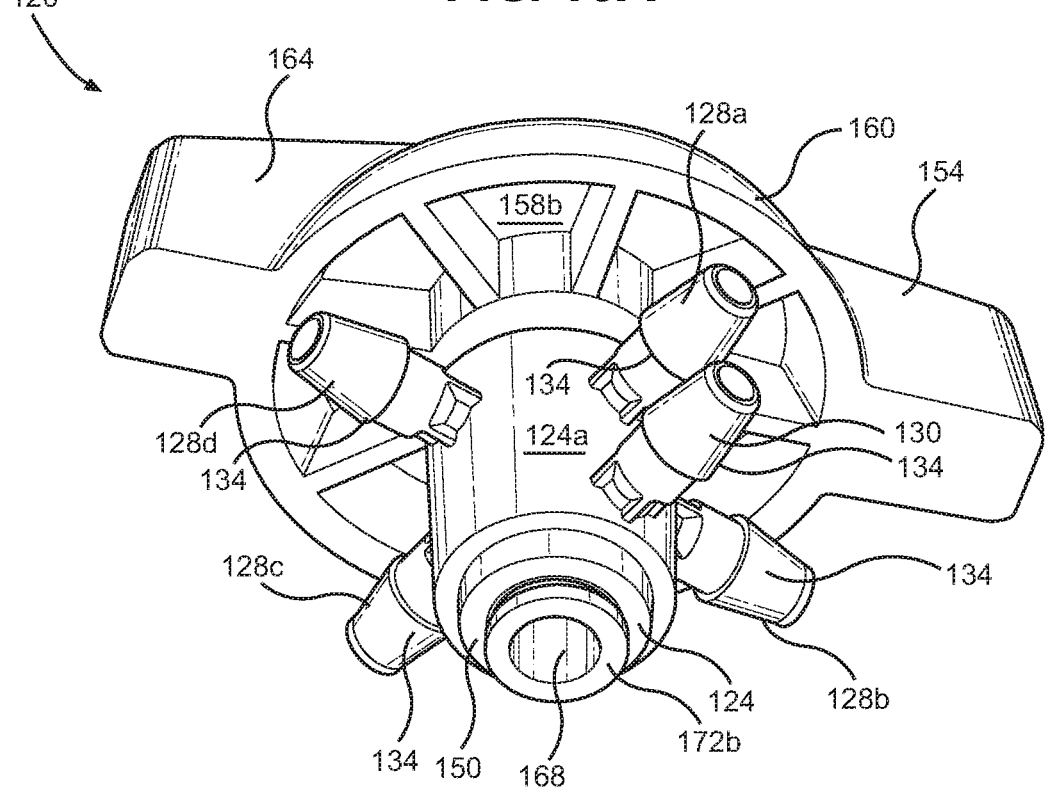
FIG. 10B is an alternative perspective view of the multi-port valve shown in FIG. 10A.

After the cover 84, and thus the directional component 44 is in the second rotational position, the cover 84 and alignment member 100 can be axially moved from the first vertical position to the second vertical position to allow the cover 84 to be rotated in the second rotational direction $R_2$ to a third rotational position, as shown in FIG. 9C. In the third rotational position, a third flow path $F_3$ is defined through the multi-port valve 10. In the third rotational position, the input port 22 receives a flow of fluid from an input, which then flows through the input port 22, through the fluid channel 52, and to the first output port 20a. Between the input port 22 and the first output port 20a, the flow of fluid is contained by the fluid channel 52, the inner surface 18b of the valve body 14, and the ledge 39, each of which prevents the fluid from escaping the fluid channel 52 and migrating to any of the other output ports. While rotation of the cover 84 and directional component 44 is only described from the first rotational position to the second and third rotational positions, rotation between any combination of these rotational positions, as well as other rotational positions that direct fluid to any of the output ports 20a-20e, can be performed as desired. Also, while rotation may be described with reference to only certain components, such as the cover 84 and directional component 44, rotation of the cover 84 also causes rotation of the alignment member 100, coupler 62, and directional component 44 relative to the valve body 14.

Now referring to FIGS. 10A-14C, a second embodiment of a multi-port valve 120 will be described for selectively changing a flow path of fluid between combinations of an input port 130 and one of the output ports 128a-128d, or alternatively blocking the flow of liquid from flowing to any of the output ports 128a-128d from the input port 130. Referring to FIGS. 10A-11 and 13, the multi-port valve 120 includes a valve body 124 that includes an outer surface 124a, an inner surface 124b opposite the outer surface 124a, and a bottom extension 150 extending from the bottom of the valve body 124 that has a decreased diameter relative to the majority of the valve body 124. The valve body 124 also includes a central cavity 146 defined by the inner surface 124b. The valve body 124 can be formed of a substantially rigid polymer, co-polymer, or other plastic. The input port 130 and the output ports 128a-128e each extend radially away from the outer surface 124a of the valve body 124. For convenience in identification hereinafter, the output ports can be referred to as a first output port 128a, a second output port 128b, a third output port 128c, and a fourth output port 128d. Each of the input port 130 and the output ports 128a-128d can define substantially hollow bodies that extend from the outer surface 124a and terminate at an outer opening 142. The input port 130 functions to interface with and receive liquid from an input, such as a conventional piece of flexible tubing. Similarly, each of the output ports 128a-128d function to interface with and transmit liquid to an output, such as a conventional piece of flexible tubing. Though four output ports 128a-128d are shown, the multi-port valve 120 can include more or less as desired. Also, though the output ports 128a-128d and the input port 130 are shown as arranged around the valve body 124 in a particular arrangement, the relative positions of the output ports 128a-128d and the input port 130 can be rearranged as desired.

Figure 11:
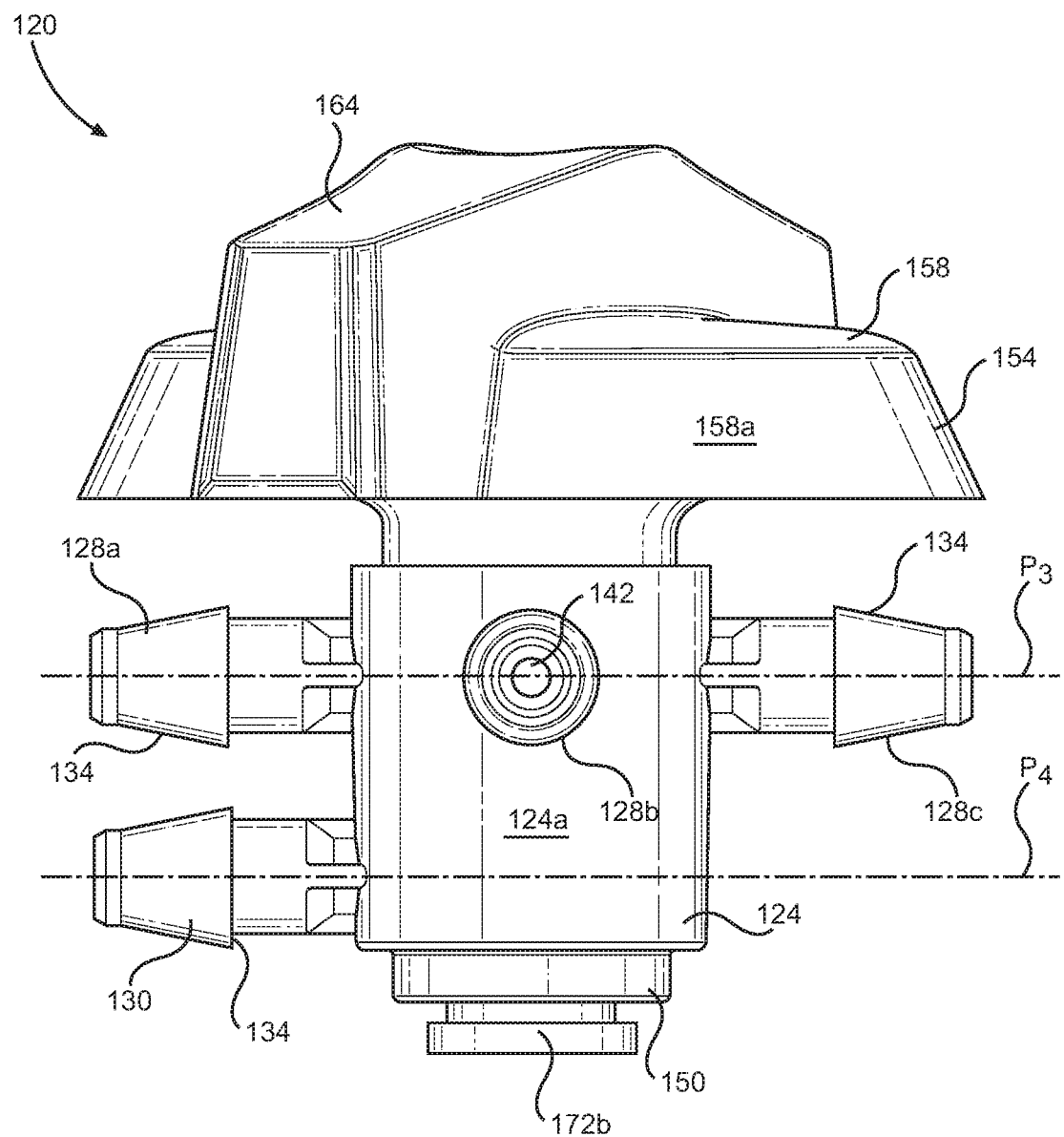
FIG. 11 is a side view of the multi-port valve shown in FIG. 10A.
Figure 12:
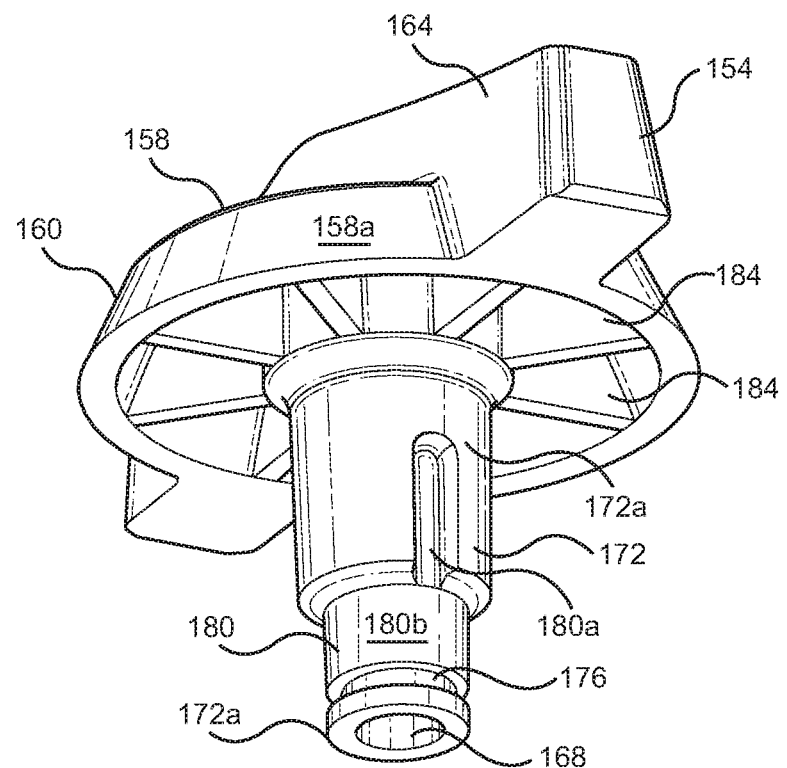
FIG. 12 is a perspective view of a directional component of the multi-port valve shown in FIG. 10A.
Figure 13:
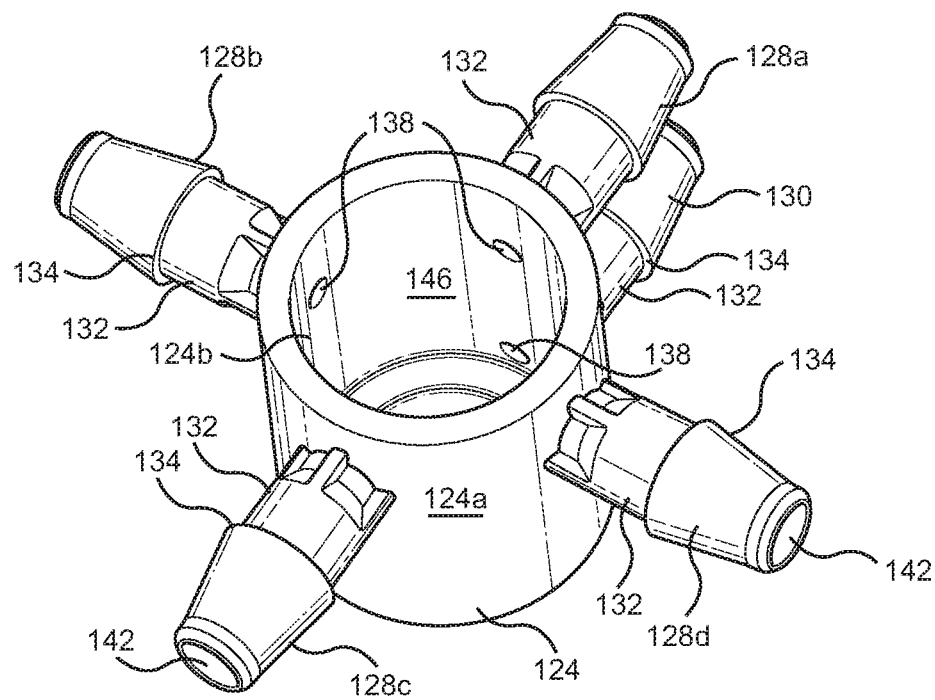
FIG. 13 is a perspective view of a valve body of the multi-port valve shown in FIG. 10A.

The input port 130 and each of the output ports 128a-128d can include an internal passage 140 for receiving a flow of liquid, where each of the internal passages 140 extends from an inner opening 138 on the inner surface 124b of the valve body 124 to an outer opening 142 located at the end of the respective port. As shown in FIG. 11, the center axis of each of the output ports 128a-128d extends along a third plane $P_3$ and the center axis of the input port 130 extends along a fourth plane $P_4$. The third plane $P_3$ can be spaced from the fourth plane $P_4$ and extend substantially parallel to the fourth plane $P_4$. In particular, the input port 130 can be positioned directly below one of the output ports 128a-128d, such as the first output port 128a in the depicted embodiment. Though the fourth plane $P_4$ is depicted as positioned below the third plane $P_3$, the third and fourth planes $P_3$ and $P_4$, and thus the input port 130 and the output ports 128a-128d, can be repositioned as desired. Each of the input port 130 and the output ports 128a-128d can be formed with a straight shaft 132 and a barb 134 extending from the outer surface of the straight shaft 132 in order to engage and retain a respective input or output, which can be a piece of conventional flexible tubing as previously described.

Now referring to FIGS. 10A-12, the multi-port valve 120 includes a directional component 154 configured to be received within the central cavity 146 of the valve body 124. The directional component 154 includes a body 158 that has an upper surface 158a, a lower surface 158b opposite the upper surface 158a, and a rim 160 that extends downward from the lower surface 158b. The directional component 154 can be formed of a substantially rigid polymer, co-polymer, or other plastic. A knob 164 can extend upwards from the upper surface 158a, where the knob 164 is configured to be gripped for manual rotation of the directional component 154. The knob 164 is depicted as having a greater diameter and height than the body 158 for easier manual actuation, though the knob 164 can be differently sized or shaped as desired. The directional component 154 can also include a shaft 172 that extends downward from an upper end 172a attached to the lower surface 158b of the body 158 to a lower end 172b axially spaced from the 158. The shaft 172 can define a bore 168 that extends from the lower end 172b of the shaft 172 to the upper end 172a. However, the bore 168 can extend to any extent through the shaft 172 as desired. The directional component 154 can also include a plurality of ribs 184 that extend from the inner surface of the rim 160 to the upper end 172a of the shaft 172 for providing structural support and stability to the directional component 154.

The shaft 172 includes a fluid channel 180 that extends from the outer surface of the shaft 172 into the shaft 172, as well as partially around a circumference of the shaft 172. When the directional component 154 is disposed within the central cavity 146 of the valve body 124 and the shaft 172 contacts the inner surface 124b of the valve body 124, the fluid channel 180 can be configured to receive a flow of liquid from the input port 130 and direct the flow of liquid to one of the output ports 128a-128d. In this embodiment, the fluid channel 180 is a single, continuous channel that is formed across the entirety of the circumference of the shaft 172 of the directional component. In the depicted embodiment, the fluid channel 180 can be understood as comprising two portions—a horizontal portion 180b and a vertical portion 180a that extends from the horizontal portion 180b. The width and depth of the fluid channel 180 can be selected in order to provide an adequate and constant liquid flow or to satisfy any other functional considerations. The horizontal portion 180b can extend around the entirety of the circumference of the shaft 172 of the directional component 154, while the vertical portion 180a can extend upward from the horizontal portion 180b and terminate at a location below the upper end 172a of the shaft 172. The horizontal portion 180b can define a similar width and depth as the vertical portion 180a, though these dimensions may differ as desired.

When the shaft 172 of the directional component 154 is disposed within the central cavity 146 of the valve body 124, the third plane $P_3$ can extend through the vertical portion 180a of the fluid channel 180, such that part of the vertical portion 180a is vertically aligned with the output ports 128a-128d. Likewise, when the shaft 172 of the directional component 154 is disposed within the central cavity 146 of the valve body 124, the fourth plane $P_4$ can extend through the horizontal portion 180b of the fluid channel 180, such that a part of the horizontal portion 180b is vertically aligned with the input port 130. As a result, in various rotational positions the fluid channel 180 can receive a liquid flow from the input port 130 and direct the liquid flow to the vertical portion 180a, which then directs the liquid flow to one of the output ports 128a-128d. The shaft 172 can also include a recess 176 that extends around the lower end 172b of the shaft 172 at a location spaced axially below the fluid channel 180. When the multi-port valve 120 is fully assembled, the recess 176 can receive a seal (not shown) that is configured to contact both the shaft 172 and the inner surface 124b of the valve body for sealing the lower end of the fluid channel 180.

Figure 14A:
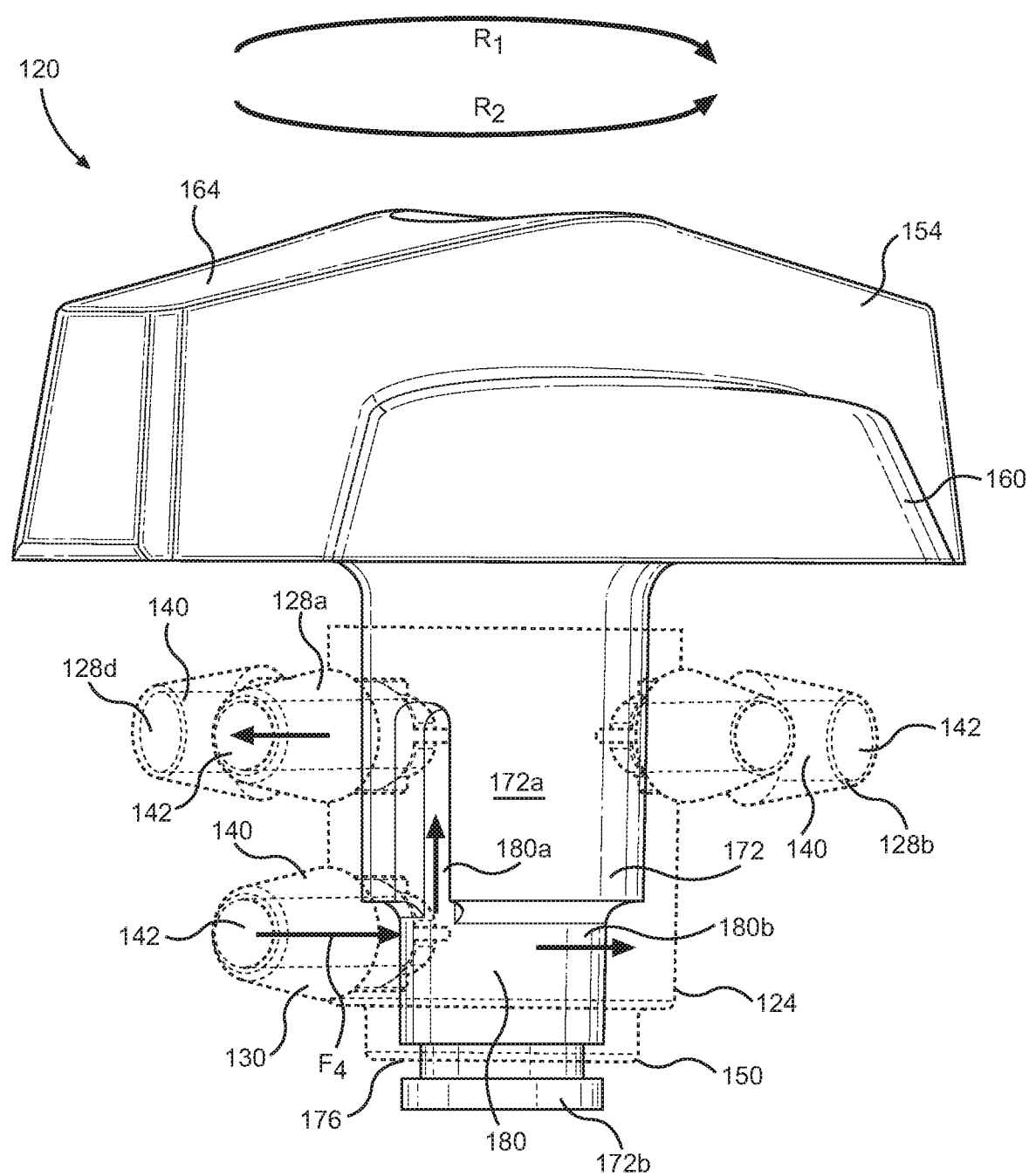
FIG. 14A is a perspective view of the multi-port valve shown in FIG. 10A, with the valve body rendered transparent and the directional component in a first rotational position.

Continuing with FIGS. 14A-14C, various rotational positions of the multi-port valve 120 will be discussed. Referring to FIG. 14A, in a first rotational position a fourth flow path $F_4$ is defined through the multi-port valve 120. In the first rotational position, the input port 130 receives a flow of fluid from an input, which then flows through the input port 130, through the fluid channel 180, and to the first output port 128a. Between the input port 130 and the first output port 128a, the flow of fluid is contained by the fluid channel 180 and the inner surface 124b of the valve body 124, which prevents the fluid from escaping the fluid channel 180 and migrating to any of the other output ports. Unlike in the multi-port valve 10, liquid is permitted to flow around an entire circumference of the shaft 172 via the horizontal portion 180b of the fluid channel 180. To alter the fluid flow path, a user can manually rotate the directional component 154 by gripping the knob 164 and/or body 158 and rotating the directional component 154 from the first rotational position to the second rotational position. Unlike in the multi-port valve 10, the directional component 154 is free to rotate a complete 360 degrees, and can be rotated without any axial movement relative to the valve body 124.

Figure 14B:
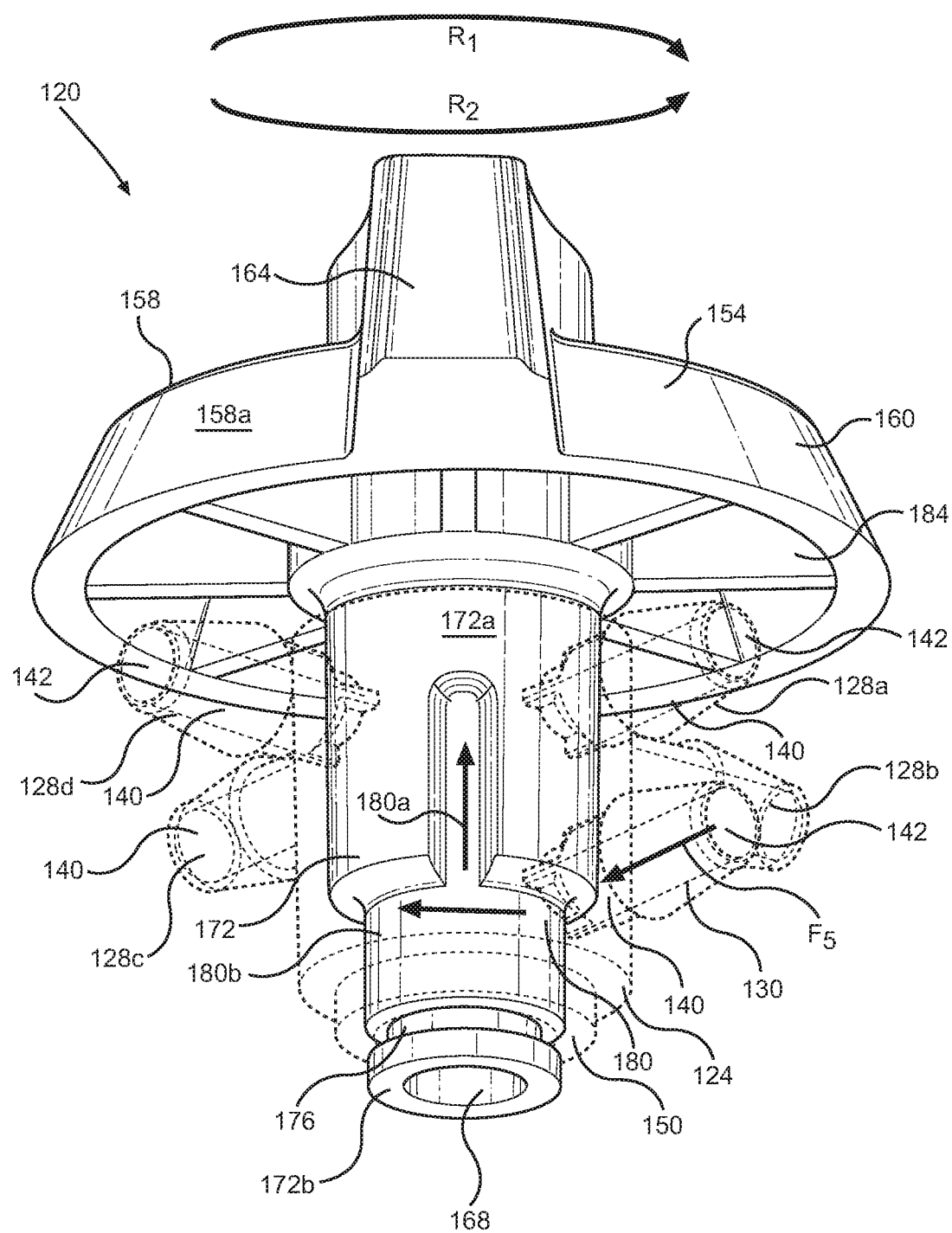
FIG. 14B is a perspective view of the multi-port valve shown in FIG. 10A, with the valve body rendered transparent and the directional component in a second rotational position.
Figure 14C:
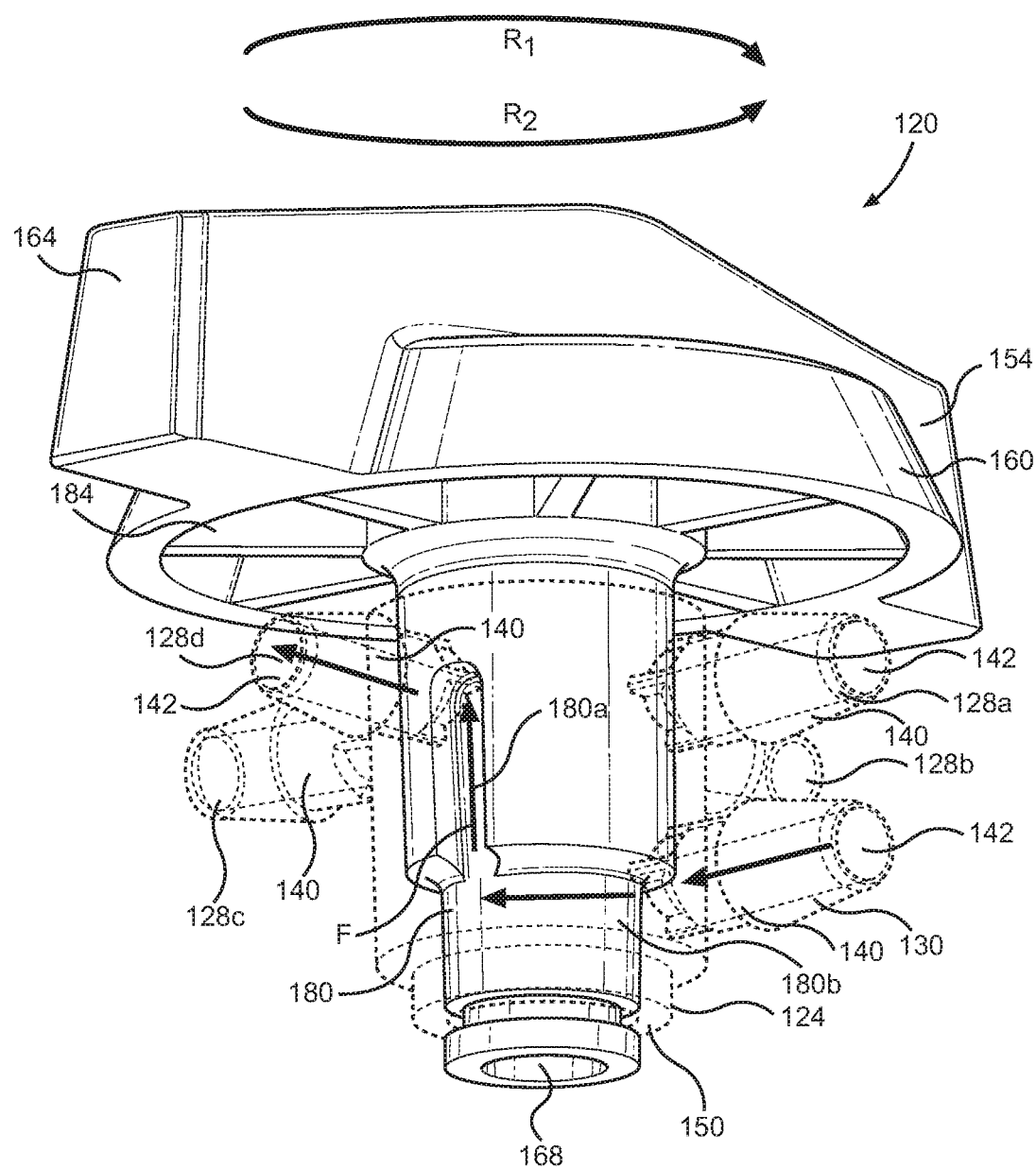
FIG. 14C is a perspective view of the multi-port valve shown in FIG. 10A, with the valve body rendered transparent and the directional component in a third rotational position.

Referring to FIG. 14B, the directional component 154 has been rotated from a first rotational position to a second rotational position. The directional component can be rotated between rotational positions in either the first rotational direction $R_1$, which is shown as a counterclockwise direction, or a second rotational direction $R_2$ that is opposite the first rotational direction $R_1$, which is shown as a clockwise direction. In the second rotational position, the vertical portion 180a of the fluid channel 180 is positioned such that it is not in communication with the internal passage 140 of any of the output ports 128a-128d, creating a fifth flow path $F_5$. As a result, the input port 130 receives a flow of fluid from an input, which then flows through the input port 130 and the vertical and horizontal portions 180a, 180b of the fluid channel 180. However, as the fluid channel 180 is not in fluid communication with any of the output ports 128a-128d, no fluid exits the multi-port valve 120. Because of this, the second rotational position can be referred to as an off position for the multi-port valve 120. Referring to FIG. 14C, in a third rotational position a fifth flow path $F_5$ is defined through the multi-port valve 120. In the third rotational position, the input port 130 receives a flow of fluid from an input, which then flows through the input port 130, through the fluid channel 180, and to the fourth output port 128d. Between the input port 130 and the fourth output port 128d, the flow of fluid is contained by the fluid channel 180 and the inner surface 124b of the valve body 124, which prevents the fluid from escaping the fluid channel 180 and migrating to any of the other output ports.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A multi-port valve, comprising:
a valve body comprising an outer surface, an inner surface opposite the outer surface that defines an internal cavity, a plurality of output ports extending from the outer surface for transmitting a liquid to respective outputs, and an input port extending from the outer surface for receiving the liquid from an input;
a directional component positioned in the internal cavity, wherein the directional component defines an outer surface, the outer surface including a channel that extends partially around a circumference of the directional component and a blocking extension that extends through the channel to prevent the channel from completely extending around the circumference; and
a cover rotationally coupled to the directional component for rotating the directional component relative to the valve body, the cover being configured to be moved axially relative to the valve body between a first vertical position and a second vertical position,
a coupler that is configured to rotationally fix the cover and the directional component relative to one another;
a biasing member that is disposed between the coupler and the cover, and is configured to bias the cover relative to the coupler into the first vertical position,
wherein the directional component is configured to direct the liquid from the input port to one of the plurality of output ports, and
wherein the directional component is not rotatable relative to the valve body when the cover is in the first vertical position, and the directional component is rotatable relative to the valve body when the cover is in the second vertical position.

2. The multi-port valve of claim 1, wherein the plurality of output ports extend along a first plane and the input port extends along a second plane that is spaced from and parallel to the first plane.

3. The multi-port valve of claim 2, wherein the channel of the directional component includes a horizontal portion vertically aligned with the input port and a vertical portion that extends from the horizontal portion, such that a part of the vertical portion is vertically aligned with the plurality of output ports.

4. The multi-port valve of claim 1, wherein the directional component is capable of rotating from a first rotational position to a second rotational position, such that in the second rotational position the blocking extension is aligned with the input port to block liquid from flowing into the channel.

5. The multi-port valve of claim 1, wherein the directional component has an inner surface opposite the outer surface and a cavity defined by the inner surface, and the coupler is disposed in the cavity of the directional component.

6. The multi-port valve of claim 1, wherein the biasing member is a spring configured to bias the cover upward into the first vertical position.

7. The multi-port valve of claim 6, further comprising an alignment member connected to the cover, the alignment member including a protrusion configured to be received by a bore of the valve body.

8. The multi-port valve of claim 7, wherein when the cover 1) is in the first vertical position, the bore of the valve body receives the protrusion of the alignment member and the directional component is rotationally fixed relative to the valve body and 2) is in the second vertical position, the protrusion of the alignment member is spaced from the bore of the valve body and the directional component is capable of rotation relative to the valve body.

9. The multi-port valve of claim 7, wherein the cover includes an upper surface, a lower surface opposite the upper surface, and a shaft extending from the lower surface, wherein the shaft extends from an upper end to a lower end opposite the upper end, the lower end configured to engage the alignment member.

10. The multi-port valve of claim 1, wherein each of the plurality of output ports and the input port include a respective barb for interfacing with a corresponding flexible tube.

11. The multi-port valve of claim 1, wherein:
the valve body comprises an upper end, a lower end opposite the upper end, a stop member extending from the upper end,
the cover includes a stop member, and
contact between the stop member of the cover and the stop member of the valve body limits rotation of the cover and the directional component relative to the valve body.

12. The multi-port valve of claim 11, wherein the stop member of the valve body is a tab that extends vertically upward from the upper end of the valve body and circumferentially around a portion of the upper end of the valve body.

13. The multi-port valve of claim 11, wherein the cover includes a rim extending from an inner surface, and the stop member of the cover comprises:
a first stop extending from an inner side of the rim; and
a second stop extending from the inner side of the rim, wherein the second stop is spaced from the first stop.

14. A multi-port valve, comprising:
a valve body comprising an outer surface, an inner surface opposite the outer surface that defines an internal cavity, a plurality of output ports extending from the outer surface for transmitting a liquid to respective outputs, and an input port extending from the outer surface for receiving the liquid from an input;
a directional component positioned in the internal cavity and configured to be rotated relative to the valve body, wherein the directional component defines an outer surface, the outer surface including a channel that extends partially around a circumference of the directional component and a blocking extension that extends through the channel to prevent the channel from completely extending around the circumference;
a cover rotationally coupled to the directional component for rotating the directional component relative to the valve body, the cover being configured to be moved axially relative to the valve body between a first vertical position and a second vertical position;
a spring configured to bias the cover upward into the first vertical position; and
an alignment member connected to the cover, the alignment member including a protrusion configured to be received by a bore of the valve body,
wherein the directional component is configured to direct the liquid from the input port to one of the plurality of output ports when the directional component is in a first rotational position.

15. The multi-port valve of claim 14, wherein when the cover 1) is in the first vertical position, the bore of the valve body receives the protrusion of the alignment member and the directional component is rotationally fixed relative to the valve body and 2) is in the second vertical position, the protrusion of the alignment member is spaced from the bore of the valve body and the directional component is capable of rotation relative to the valve body.

16. The multi-port valve of claim 14, wherein the cover includes an upper surface, a lower surface opposite the upper surface, and a shaft extending from the lower surface, wherein the shaft extends from an upper end to a lower end opposite the upper end, the lower end configured to engage the alignment member.

17. The multi-port valve of claim 14, wherein the plurality of output ports extend along a first plane and the input port extends along a second plane that is spaced from and parallel to the first plane.

18. The multi-port valve of claim 17, wherein the channel of the directional component includes a horizontal portion vertically aligned with the input port and a vertical portion that extends from the horizontal portion, such that a part of the vertical portion is vertically aligned with the plurality of output ports.

19. The multi-port valve of claim 14, wherein the directional component is capable of rotating from the first rotational position to a second rotational position, such that in the second rotational position the blocking extension is aligned with the input port to block liquid from flowing into the channel.

20. The multi-port valve of claim 14, wherein the directional component has an inner surface opposite the outer surface and a cavity defined by the inner surface, the multi-port valve further comprising:
a coupler disposed in the cavity of the directional component, wherein the coupler is configured to rotationally couple the directional component to the cover.

21. The multi-port valve of claim 14, wherein:
the valve body comprises an upper end, a lower end opposite the upper end, a stop member extending from the upper end,
the cover includes a stop member, and
contact between the stop member of the cover and the stop member of the valve body limits rotation of the cover and the directional component relative to the valve body.

22. The multi-port valve of claim 21, wherein the cover includes a rim extending from an inner surface, and the stop member of the cover comprises:
a first stop extending from an inner side of the rim; and
a second stop extending from the inner side of the rim, wherein the second stop is spaced from the first stop.

* * * * *